United States Patent
Sawada et al.

(10) Patent No.: US 7,457,697 B2
(45) Date of Patent: Nov. 25, 2008

(54) VEHICLE INTEGRATION CONTROL SYSTEM AND PROGRAM

(75) Inventors: Mamoru Sawada, Yokkaichi (JP);
Toshiki Matsumoto, Kariya (JP);
Tsutomu Tashiro, Nagoya (JP);
Mamoru Mabuchi, Kariya (JP);
Takehito Fujii, Anjo (JP); Motoaki Kataoka, Kariya (JP)

(73) Assignee: DENSO Corporation, Kariya (JP)

( * ) Notice: Subject to any disclaimer, the term of this patent is extended or adjusted under 35 U.S.C. 154(b) by 797 days.

(21) Appl. No.: 11/020,003

(22) Filed: Dec. 21, 2004

(65) Prior Publication Data
US 2005/0143896 A1    Jun. 30, 2005

(30) Foreign Application Priority Data
Dec. 24, 2003   (JP)   ............................. 2003-428160

(51) Int. Cl.
*B62D 7/15*   (2006.01)
*G06F 19/00*   (2006.01)

(52) U.S. Cl. ............................. 701/48; 701/42; 701/53; 701/61; 701/69; 180/400; 180/197; 477/34; 477/107

(58) Field of Classification Search ............... 701/42, 701/48, 53, 61, 69; 180/400; 477/34
See application file for complete search history.

(56) References Cited

U.S. PATENT DOCUMENTS

| | | | |
|---|---|---|---|
| 4,766,967 A * | 8/1988 | Slicker et al. | ............... 180/54.1 |
| 4,897,776 A | 1/1990 | Urababa et al. | |
| 5,297,646 A | 3/1994 | Yamamura et al. | |
| 6,230,092 B1 * | 5/2001 | Becker et al. | ................. 701/84 |
| 6,314,342 B1 * | 11/2001 | Kramer et al. | ................. 701/1 |

(Continued)

FOREIGN PATENT DOCUMENTS

DE    4133060    4/1993

(Continued)

OTHER PUBLICATIONS

Takeuchi, Choi, Kan & Togai, Sensiibility Analysis of Vibration Transfer Path and Control of Input Force for Reduction of Acceleration and Deceleration Shock, Technical Review, No. 15, 2003, pp. 32-41.*

(Continued)

*Primary Examiner*—Thomas G Black
*Assistant Examiner*—Lin B Olsen
(74) *Attorney, Agent, or Firm*—Harness, Dickey & Pierce, PLC

(57) ABSTRACT

A vehicle integration control system includes a manager controller and a driving system controller. The manager controller sets a target generation driving force guide value for a driving force outputted from a driving system of a vehicle. The driving system controller controls the driving force on the basis of the target generation driving force guide value. The manager controller includes a driver request value setter and a driving force corrector. The driver request value setter sets a driver request generation driving force value corresponding to the driving force outputted from the driving system on the basis of a driver's input. The driving force corrector corrects the driver request generation driving force value on the basis of a predetermined program to restrain vibration generated in the vehicle when the driving force outputted from the driving system.

19 Claims, 13 Drawing Sheets

U.S. PATENT DOCUMENTS

| | | | |
|---|---|---|---|
| 6,330,504 B1 * | 12/2001 | Toukura et al. | 701/54 |
| 6,553,297 B2 | 4/2003 | Tashiro et al. | |
| 6,678,605 B2 | 1/2004 | Kisaka et al. | |
| 6,810,314 B2 * | 10/2004 | Tashiro et al. | 701/48 |
| 6,871,133 B2 * | 3/2005 | Togai et al. | 701/104 |
| 2005/0049761 A1 * | 3/2005 | Kataoka et al. | 701/1 |

FOREIGN PATENT DOCUMENTS

| | | | |
|---|---|---|---|
| EP | 1787852 A2 * | 5/2007 | |
| FR | 2598765 | 11/1987 | |
| GB | 2262818 A * | 6/1993 | |
| JP | B2-2621390 | 6/1989 | |
| JP | B2-2913748 | 1/1992 | |
| JP | B2-2518445 | 5/1996 | |
| JP | A-2001-173505 | 6/2001 | |
| JP | A-2003-41987 | 2/2003 | |
| JP | A-2003-47109 | 2/2003 | |

OTHER PUBLICATIONS

Choi and Togai, Passenger Car Acceleration Vibration Suppression Strategy with Constraint Control, SICE Annual Conference n Fukui, Aug. 4-6, 2003,vol. 1 pp. 607-611.*

Extended Search Report dated Jun. 28, 2006 from corresponding EP divisional patent application.

Office Action dated Apr. 4, 2008 in corresponding Japanese Application No. 2003-428160.

* cited by examiner

VEHICLE INTEGRATION CONTROL SYSTEM AND PROGRAM

CROSS REFERENCE TO RELATED APPLICATIONS

This application is based upon and claims the benefit of priority of Japanese Patent Application No. 2003-428160, filed on Dec. 24, 2003, the contents of which are incorporated herein by reference.

FIELD OF THE INVENTION

The present invention relates to a vehicle integration control system for controlling driving force outputted from a driving system of a vehicle.

BACKGROUND OF THE INVENTION

In recent years, vehicle integration control systems have been proposed to cope with large vehicle systems caused by the increased number of constructional elements required in modern vehicles. These systems are constructed to mutually send and receive data between control elements, which are arranged in the constructional elements, to enable stable control of the entire vehicle.

For example, Japanese patent document JP-A-2002-36919 discloses a vehicle integration control system for stabilizing vehicle behavior. This is achieved by rapidly sending and receiving important information between a plurality of constructional element controllers. The controllers are for processing control subjects such as engine output and braking force. Additionally, a manager controller is provided for generally controlling the operations of the plurality of constructional element controllers.

However, with respect to the above vehicle integration control system, there is no concrete proposal regarding a suitable construction in restraining vibration generated in the vehicle.

When the vibration generated in the vehicle is increased, a riding feeling naturally becomes worse. Further, when a ground load of each wheel is changed due to the vehicle vibration, the behavior of the vehicle becomes unstable and steering stability of the vehicle is greatly reduced.

Furthermore, there are various generating causes of the vehicle vibration. For example, in one case, vehicle vibration is increased by a driving system outputting an inappropriate amount of driving force. The driving system may include a driving source such as an engine, a drive shaft connected to the driving source through a speed change gear, and a drive wheel connected to the drive shaft through a differential gear.

SUMMARY OF THE INVENTION

Therefore, an object of the invention is to provide a vehicle integration control system that is capable of restraining vibrations generated in a vehicle by controlling a driving force outputted from a driving system.

In the vehicle integration control system of the invention made to achieve the above object, a manager controller sets a target generation driving force guide value as a guide value for e driving force to be outputted by the driving system of a vehicle. A driving system controller controls the driving force outputted from the driving system on the basis of the target generation driving force guide value set by the manager controller.

Furthermore, the manager controller has a driver request value setter and a driving force corrector. The driver request value setter sets a driver request generation driving force value corresponding to the driving force outputted from the driving system on the basis of driving force request information of the driving system inputted by a driver of the vehicle. The driving force corrector corrects the driver request generation driving force value on the basis of a predetermined program to restrain vibration generated in the vehicle while the driving force outputted from the driving system changes on the basis of the driver request generation driving force value set by the driver request value setter. Additionally, the driving force corrector sets the value obtained by this correction as the target generation driving force guide value.

Thus, the driving force outputted from the driving system is controlled on the basis of the target generation driving force guide value obtained in the viewpoint of restraining the vibration generated in the vehicle.

Accordingly, the effect of suitably restraining the vehicle vibration is obtained in comparison with a case in which the driving force outputted from the driving system is directly controlled on the basis of the driver request generation driving force value corresponding to the driving force request information inputted by the driver of the vehicle.

Here, "the driving force request information inputted by the driver of the vehicle" is not limited to any specific information. For example, the vehicle integration control system may also be constructed to include an accelerator pedal aperture detector. In one embodiment, the accelerator pedal aperture detector may be an accelerator aperture sensor 30, as will be described later. The accelerator pedal aperture detector is provided for detecting a depression of the accelerator pedal. The detected value would then be included in "the driving force request information inputted by the driver of the vehicle."

Furthermore, the driver request value setter is desirably constructed to set the driver request generation driving force value according to the speed of the vehicle in addition to "the driving force request information inputted by the driver of the vehicle." This provides a reliably appropriate driver request generation driving force value as a correcting object of the driving force corrector.

With respect to the vehicle speed, a vehicle speed detector for detecting the vehicle speed may be arranged in the vehicle integration control system. A detected vehicle speed may, therefore, also be used to set the driver request generation driving force value.

Furthermore, the driving force corrector is desirably constructed to correct the driver request generation driving force value according to various determined values relating to vehicle behavior. In one embodiment, a vehicle state determiner determines the determined values. Additionally, the driving force detector sets the value obtained by this correction as the target generation driving force guide value such that a correction process using the driving force corrector is reliably appropriate.

Here, for example, the vehicle state determiner may determine a determined value of a front wheel vehicle body forward-backward force as a sum total of a reaction force of the vehicle body in a forward-backward direction applied to a tire grounding face of a front wheel of the vehicle. The vehicle state determiner may also determine a determined value of a rear wheel vehicle body forward-backward force as a sum total of a reaction force of the vehicle body in a forward-backward direction applied to a tire grounding face of a rear wheel of the vehicle. The vehicle state determiner may further determine at least one of a determined value of a crewmember head portion displacement amount as a vertical direction movement amount of the head portion position of the driver of the vehicle. Further yet, the vehicle state determiner may determine a value of a vehicle body pitch angle of the vehicle.

The vehicle integration control system of the invention may further have a front wheel lateral force determiner for determining a front wheel lateral force as a sum total of lateral forces applied to the respective front wheels of the vehicle. Additionally, the vehicle integration control system may include a steering angle detector for detecting a steering angle of the front wheel of the vehicle.

In this case, the vehicle state determiner may determine the determined value of the front wheel vehicle body forward-backward force on the basis of the following arithmetic formula:

$$Ffw = Fyf \cdot \sin \delta,$$

wherein Ffw is the front wheel vehicle body forward-backward force, Fyf is the front wheel lateral force, and $\delta$ is the steering angle. In the above formula, the front wheel lateral force is that determined by the front wheel lateral force determiner and the steering angle is that detected by the steering angle detector.

Furthermore, a rear wheel brake torque detector for detecting a sum of brake torques applied to rear wheels of the vehicle may be also arranged in the vehicle integration control system of the invention.

In this case, the vehicle state determiner may determine the determined value of the rear wheel vehicle body forward-backward force on the basis of the following arithmetic formula:

$$Frw = Fwr - Tb \cdot r - R,$$

wherein Frw is the rear wheel vehicle body forward-backward force, Fwr is the driver request generation driving force value, Tb is the sum of the brake torques applied to the respective rear wheels of the vehicle, r is a predetermined tire radius of the rear wheel, and R is the predetermined sum of rolling resistance forces applied to the respective rear wheels. In the above formula, the sum of the brake torques applied to the respective rear wheels is that detected by the rear wheel brake torque detector and the driver request generation driving force value is that set by the driver request value setter.

Furthermore, when the vehicle state determiner determines at least the determined value of the front wheel vehicle body forward-backward force, the determined value of the rear wheel vehicle body forward-backward force, and the determined value of the crewmember head portion displacing amount, the vehicle integration control system of the invention may also have include a front wheel suspension displacement amount detector and a rear wheel suspension displacement amount detector. The front wheel suspension displacement amount detector is provided for detecting a suspension displacement amount of a suspension device arranged in the front wheel of the vehicle. The rear wheel suspension displacement amount detector is provided for detecting a suspension displacement amount of a suspension device arranged in the rear wheel of the vehicle.

In this case, the vehicle state determiner may also determine the determined value of the crewmember head portion displacement amount on the basis of the following arithmetic formula:

$$dh = (hsf \cdot Lhr + hsr \cdot Lhf)/(Lhf + Lhr),$$

wherein dh is the crewmember head portion displacement amount, hsf is the suspension displacement amount of the suspension device arranged in the front wheel of the vehicle, hsr is the suspension displacement amount of the suspension device arranged in the rear wheel of the vehicle, Lhf is the predetermined forward-backward direction distance from the head portion position of the driver of the vehicle to the position of the suspension device of the front wheel of the vehicle, and Lhr is the predetermined forward-backward direction distance from the head portion position of the driver of the vehicle to the position of the suspension device of the rear wheel of the vehicle. In the above formula, the suspension displacement amount is that detected by the front wheel suspension displacement amount detector and the suspension displacement amount is that detected by the rear wheel suspension displacement amount detector.

Furthermore, when the vehicle state determiner determines at least the determined value of the front wheel vehicle body forward-backward force, the determined value of the rear wheel vehicle body forward-backward force, and the determined value of the vehicle body pitch angle, the vehicle integration control system of the invention may have both of the above-described front wheel and rear wheel suspension displacement amount detectors.

In this case, the vehicle state determiner may also determine the determined value of the vehicle body pitch angle on the basis of the following arithmetic formula:

$$\theta = (hsf - hsr)/L,$$

wherein $\theta$ is the vehicle body pitch angle, hsf is the suspension displacement amount of the suspension device arranged in the front wheel of the vehicle, hsr is the suspension displacement amount of the suspension device arranged in the rear wheel of the vehicle, and L is the predetermined length between the position of the suspension device arranged in the front wheel of the vehicle and the position of the suspension device arranged in the rear wheel of the vehicle. In the above formula, the suspension displacement amount is that detected by the front wheel suspension displacement amount detector and the suspension displacement amount is that detected by the rear wheel suspension displacement amount detector.

For example, the suspension displacement amount hsf of the suspension device arranged in the front wheel of the above vehicle may be the suspension displacement amount of the suspension device arranged near one of the left and right front wheels of the vehicle. Alternatively, the suspension displacement amount hsf may also be an average of the suspension displacement amount of a suspension device arranged near the left front wheel of the vehicle and the suspension displacement amount of a suspension device arranged near the right front wheel.

Furthermore, the suspension displacement amount hsr of the suspension device arranged in the rear wheel of the above vehicle may be the suspension displacement amount of a suspension device arranged in one of the left and right rear wheels of the vehicle. Alternatively, the suspension displacement amount hsr may also be an average value of the suspension displacement amount of a suspension device arranged near the left rear wheel of the vehicle and a suspension displacement amount of the suspension device arranged near the right rear wheel.

On the other hand, with respect to the driving force corrector, various modes are considered according to whether a target generation driving force premise value is corrected to reduce the vibration generated in the vehicle from which viewpoint.

For example, the driving force corrector may determine a value after the correction of the driver request generation driving force value for restraining the displacement of the head portion of the driver of the vehicle generated when changing the driving force outputted from the driving system on the basis of the driver request generation driving force value set by the driver request value setter. Alternatively, the driving force corrector may also set the target generation driving force guide value on the basis of the value after the correction.

In this case, the displacement of the head portion of the driver is suitably restrained by controlling the driving force outputted from the driving system with the driving system controller on the basis of the target generation driving force guide value set by the driving force corrector as compared with a case in which the driving force outputted from the driving system is directly controlled on the basis of the driver request generation driving force value corresponding to the driving force request information inputted by the driver of the vehicle.

Here, for example, the driving force corrector may have a crewmember vibration damping correcting value determiner, as is described below.

In this case, the crewmember vibration damping correcting value determiner determines the crewmember vibration damping driving force correcting value as a correcting value of the driver request generation driving force value to restrain the displacement of the head portion of the driver of the vehicle generated in the changing case of the driving force outputted from the driving system on the basis of the driver request generation driving force value set by the driver request value setter. Furthermore, in this case, the driving force corrector corrects the driver request generation driving force value on the basis of the crewmember vibration damping driving force correcting value.

Accordingly, the displacement of the head portion of the driver is suitably restrained and the above-described effect is obtained by controlling the driving force outputted from the driving system by the driving system controller in accordance with the target generation driving force guide value set according to this correction as compared with a case in which the driving force outputted from the driving system is directly controlled on the basis of the driver request generation driving force value corresponding to the driving force request information inputted by the driver of the vehicle.

For example, it may also be constructed such that determination processing using the crewmember vibration damping correcting value determiner is performed by using the determined value and the above-described vehicle state determiner to appropriately determine the crewmember vibration damping driving force correcting value according to the crewmember vibration damping correcting value determiner.

More specifically, first, the vehicle state determiner is constructed to determine at least the determined value of the front wheel vehicle body forward-backward force, the determined value of the rear wheel vehicle body forward-backward force, and the determined value of the crewmember head portion displacement amount. The crewmember vibration damping correcting value determiner is constructed to determine the crewmember vibration damping driving force correcting value on the basis of these determined values determined by the vehicle state determiner.

Accordingly, the crewmember vibration damping driving force correcting value is obtained as a value corresponding to the real vehicle state. In this case, since the driving force outputted from the driving system is controlled to correspond to the target generation driving force guide value set by the driving force corrector on the basis of this crewmember vibration damping driving force correcting value, the effect of more suitably restraining the displacement of the head portion of the driver is obtained.

Alternatively, the following construction may also be adopted to obtain a highly reliable crewmember vibration damping driving force correcting value based on the determined value according to the vehicle state determiner.

In this alternative construction, the crewmember vibration damping correcting value determiner has a crewmember vibration damping foreknowledge correcting value determiner, a crewmember vibration damping feedback correcting value determiner, and a crewmember vibration damping correcting value calculator, as is described below.

The crewmember vibration damping foreknowledge correcting value determiner determines a crewmember vibration damping driving force foreknowledge correcting value as a correcting value of the driver request generation driving force value for restraining displacement of the head portion of the driver of the vehicle generated when the driving force outputted from the driving system changes according to the driver request generation driving force value set by the driver request value setter using the determined values of the front wheel vehicle body forward-backward force and the rear wheel vehicle body forward-backward force obtained by the vehicle state determiner.

The crewmember vibration damping feedback correcting value determiner determines a crewmember vibration damping driving force feedback correcting value as a feedback correcting value of the crewmember vibration damping driving force foreknowledge correcting value determined by the crewmember vibration damping foreknowledge correcting value determiner by using the determined value of the crewmember head portion displacement amount obtained by the vehicle state determiner.

Further, the crewmember vibration damping correcting value calculator determines the crewmember vibration damping driving force correcting value by correcting the crewmember vibration damping driving force foreknowledge correcting value determined by the crewmember vibration damping foreknowledge correcting value determiner by the crewmember vibration damping driving force feedback correcting value determined by the crewmember vibration damping feedback correcting value determiner.

In accordance with such a construction, the crewmember vibration damping driving force correcting value is obtained with a high value of reliability corresponding to the real vehicle state.

Namely, in this case, the crewmember vibration damping driving force foreknowledge correcting value is determined as a correcting value of the driver request generation driving force value for restraining the displacement of the head portion of the driver on the basis of the determined value of the front wheel vehicle body forward-backward force and the determined value of the rear wheel vehicle body forward-backward force showing the vehicle state. Furthermore, this determined value is corrected by the crewmember vibration damping driving force feedback correcting value as a feedback correcting value corresponding to the determined value of the crewmember head portion displacement amount corresponding to a control object amount intended to be restrained. This determined value is then set to the crewmember vibration damping driving force correcting value.

Accordingly, in this case, the crewmember vibration damping driving force correcting value can be obtained eith a high level of reliability corresponding to a numerical value showing the vehicle state including the crewmember head portion displacement amount corresponding to the object amount intended to be restrained.

Furthermore, in this case, the driving force outputted from the driving system is controlled to correspond to the target generation driving force guide value set by the driving force corrector on the basis of the crewmember vibration damping driving force correcting value obtained in this way. Therefore, the displacement of the head portion of the driver is more suitably restrained.

On the other hand, for example, the driving force corrector may determine a value after the correction of the driver request generation driving force value for restraining the vehicle body vibration (spring upward vibration) of the vehicle generated in the changing case of the driving force outputted from the driving system on the basis of the driver request generation driving force value set by the driver request value setter. Additionally, the driving force corrector may also set the target generation driving force guide value on the basis of the value after the correction.

In this case, the vehicle body vibration is more suitably restrained by controlling the driving force outputted from the driving system on the basis of the target generation driving force guide value set by the driving force corrector by the driving system controller as as compared with a case in which the driving force outputted from the driving system is directly controlled on the basis of the driver request generation driving force value corresponding to the driving force request information inputted by the driver of the vehicle.

The vehicle body vibration described herein is the vibration of a system (the vehicle body system and a portion above a spring) placed through the suspension device (a suspension spring, etc.) in a vibrating system (a portion below the spring) of a drive wheel, a driven wheel, etc., of the vehicle.

Here, in this case, for example, the driving force corrector may also have a vehicle body vibration damping correcting value determiner, as is described below.

In this case, the vehicle body vibration damping correcting value determiner determines a vehicle body vibration damping driving force correcting value as a correcting value of the driver request generation driving force value for restraining the vehicle body vibration of the vehicle generated in the changing case of the driving force outputted from the driving system on the basis of the driver request generation driving force value set by the driver request value setter. Further, in this case, the driving force corrector corrects the driver request generation driving force value on the basis of the vehicle body vibration damping driving force correcting value.

Accordingly, the effect of suitably restraining the vehicle body vibration similar to the above effect is obtained by controlling the driving force outputted from the driving system in accordance with the target generation driving force guide value set on the basis of this correction by the driving system controller in comparison with a case in which the driving force outputted from the driving system is directly controlled on the basis of the driver request generation driving force value corresponding to the driving force request information inputted by the driver of the vehicle.

Here, for example, it may be also constructed such that determination processing using the vehicle body vibration damping correcting value determiner is performed by using the determined value and the above-described vehicle state determiner to appropriately determine the vehicle body vibration damping driving force correcting value using the vehicle body vibration damping correcting value determiner.

More specifically, the vehicle state determiner is first constructed to determine at least the determined value of the front wheel vehicle body forward-backward force, the determined value of the rear wheel vehicle body forward-backward force, and the determined value of the vehicle body pitch angle. Furthermore, the vehicle body vibration damping correcting value determiner is constructed to determine the vehicle body vibration damping driving force correcting value on the basis of these determined values determined by the vehicle state determiner.

Accordingly, the vehicle body vibration damping driving force correcting value is obtained as a value corresponding to the real vehicle state. In this case, the vehicle body vibration is more suitably restrained since the driving force outputted from the driving system is controlled to correspond to the target generation driving force guide value set by the driving force corrector on the basis of this vehicle body vibration damping driving force correcting value.

Additionally, the following construction may be also adopted to obtain a vehicle body vibration damping driving force correcting value of a high reliability according to the determined value using the vehicle state determiner.

In this case, the vehicle body vibration damping correcting value determiner has a vehicle body vibration damping foreknowledge correcting value determiner, a vehicle body vibration damping feedback correcting value determiner, and a vehicle body vibration damping correcting value calculator, as is described below.

The vehicle body vibration damping foreknowledge correcting value determiner determines the vehicle body vibration damping driving force foreknowledge correcting value as a correcting value of the driver request generation driving force value for restraining the vehicle body vibration of the vehicle generated in the changing case of the driving force outputted from the driving system on the basis of the driver request generation driving force value set by the driver request value setter by using the determined value of the front wheel vehicle body forward-backward force and the determined value of the rear wheel vehicle body forward-backward force obtained by the vehicle state determiner.

The vehicle body vibration damping feedback correcting value determiner determines the vehicle body vibration damping driving force feedback correcting value as a feedback correcting value of the vehicle body vibration damping driving force foreknowledge correcting value determined by the vehicle body vibration damping foreknowledge correcting value determiner by using the determined value of the vehicle body pitch angle obtained by the vehicle state determiner.

Furthermore, the vehicle body vibration damping correcting value calculator determines the vehicle body vibration damping driving force correcting value by correcting the vehicle body vibration damping driving force foreknowledge correcting value determined by the vehicle body vibration damping foreknowledge correcting value determiner by the vehicle body vibration damping driving force feedback correcting value determined by the vehicle body vibration damping feedback correcting value determiner.

Accordingly, the vehicle body vibration damping driving force correcting value is obtained as a highly reliable value corresponding to the real vehicle state.

Namely, in this case, the vehicle body vibration damping driving force foreknowledge correcting value is determined as a correcting value of the driver request generation driving force value for restraining the vehicle body vibration on the basis of the determined value of the front wheel vehicle body forward-backward force and the determined value of the rear wheel vehicle body forward-backward force showing the vehicle state. Furthermore, this determined value is corrected by the vehicle body vibration damping driving force feedback correcting value as a feedback correcting value corresponding to the determined value of the vehicle body pitch angle corresponding to a control object amount intended to be restrained and is then set to the vehicle body vibration damping driving force correcting value.

Accordingly, in this case, the vehicle body vibration damping driving force correcting value can be obtained as a highly reliable value corresponding to a numerical value showing the vehicle state including the vehicle body pitch angle corresponding to the object amount intended to be restrained.

In this case, the effect of more suitably restraining the vehicle body vibration is obtained since the driving force outputted from the driving system is controlled to correspond to the target generation driving force guide value set by the driving force corrector on the basis of the vehicle body vibration damping driving force correcting value obtained in this way.

On the other hand, for example, the driving force corrector may determine a value after the correction of the driver request generation driving force value for restraining torsional vibration generated in a drive shaft for transmitting the driving force of a driving source to a drive wheel of the vehicle when the driving force outputted from the driving system is changed on the basis of the driver request generation driving force value set by the driver request value setter. The driving force corrector may also set the above-described target generation driving force guide value on the basis of the value after the correction.

In this case, the effect of suitably restraining the torsional vibration generated in the drive shaft is obtained by controlling the driving force outputted from the driving system on the basis of the target generation driving force guide value set by the driving force corrector by the driving system controller as compared with a case in which the driving force outputted from the driving system is directly controlled on the basis of the driver request generation driving force value corresponding to the driving force request information inputted by the driver of the vehicle.

The torsional vibration described herein is a torsional vibration of the drive shaft rotating direction generated in the drive shaft interposed between the driving source and the drive wheel by an external disturbance such as a change in the output torque, rolling of the drive wheel onto a rock, etc.

Here, the vehicle integration control system of the invention may also have a drive wheel rotating speed detector for detecting the rotating speed of each drive wheel of the vehicle and a drive shaft rotating speed detector for detecting the rotating speed of the drive shaft for transmitting the driving force of the driving source to the drive wheel of the vehicle.

In this case, for example, the driving force corrector may have a value determiner after the driving system vibration damping correction described below.

In this case, the value determiner after the driving system vibration damping correction determines a driver request generation driving force value after the driving system vibration damping correction as a value after the correction of the driver request generation driving force value for restraining the torsional vibration generated in the drive shaft for transmitting the driving force of the driving source to the drive wheel of the vehicle in the controlling case of the driving force outputted from the driving system on the basis of the driver request generation driving force value set by the driver request value setter by using the detecting values detected by the above drive wheel rotating speed detector and the drive shaft rotating speed detector in addition to the driver request generation driving force value set by the driver request value setter. Furthermore, the driving force corrector sets the target generation driving force guide value on the basis of the driver request generation driving force value after the driving system vibration damping correction.

Accordingly, the target generation driving force guide value for restraining the torsional vibration generated in the drive shaft can be set as a value corresponding to the real vehicle state such as the rotating speed of each drive wheel of the vehicle and the rotating speed of the drive shaft for transmitting the driving force of the driving source to the drive wheel of the vehicle in addition to the driver request generation driving force value. Furthermore, the torsional vibration generated in the drive shaft is further suitably restrained since the driving force outputted from the driving system is controlled to correspond to the target generation driving force guide value corresponding to the real vehicle state in this way.

Here, for example, the following construction may be adopted to obtain the driver request generation driving force value after the driving system vibration damping correction of a high reliability by using the detecting values detected by the drive wheel rotating speed detector and the drive shaft rotating speed detector in addition to the driver request generation driving force value set by the driver request value setter.

In this case, the value determiner after the driving system vibration damping correction has a value determiner after the driving system vibration damping foreknowledge correction, a driving system vibration damping feedback correcting value determiner and a driver request value calculator after the driving system vibration damping correction described below.

The value determiner after the driving system vibration damping foreknowledge correction determines a target generation driving force premise value after the driving system vibration damping foreknowledge correction as a value after the correction of the driver request generation driving force value for restraining the torsional vibration generated in the drive shaft for transmitting the driving force of the driving source to the drive wheel of the vehicle in the changing case of the driving force outputted from the driving system on the basis of the driver request generation driving force value by using the driver request generation driving force value set by the driver request value setter.

The driving system vibration damping feedback correcting value determiner determines the driving system vibration damping driving force feedback correcting value as a feedback correcting value of the driver request generation driving force value after the driving system vibration damping foreknowledge correction determined by the value determiner after the driving system vibration damping foreknowledge correction by using the rotating speed of each drive wheel detected by the drive wheel rotating speed detector and the rotating speed of the drive shaft detected by the drive shaft rotating speed detector.

Furthermore, the driver request value calculator after the driving system vibration damping correction determines the driver request generation driving force value after the driving system vibration damping correction by correcting the driver request generation driving force value after the driving system vibration damping foreknowledge correction determined by the value determiner after the driving system vibration damping foreknowledge correction by the driving system vibration damping driving force feedback correcting value determined by the driving system vibration damping feedback correcting value determiner.

Accordingly, the driver request generation driving force value after the driving system vibration damping correction is obtained as a highly reliable value corresponding to the real vehicle state.

Namely, as described above, the driving system vibration damping driving force feedback correcting value is first determined by using the detecting values using the drive wheel rotating speed detector and the drive shaft rotating speed detector, i.e., the detecting value of the rotating speed of each drive wheel and the detecting value of the rotating speed of the drive shaft. Accordingly, the driving system vibration damping driving force feedback correcting value becomes a value corresponding to such a detecting value of the rotating speed of each drive wheel and such a detecting value of the rotating speed of the drive shaft.

On the other hand, if such a detecting value of the rotating speed of each drive wheel and such a detecting value of the rotating speed of the drive shaft are used, an amount (hereinafter called a "torsional amount corresponding value of the drive shaft") showing the degree of torsion generated in the drive shaft can be obtained.

Here, for example, the torsional amount corresponding value of the drive shaft can be calculated on the basis of the following arithmetic formula:

$$Sc = N3 - (Kdiff/2) \cdot (Vwdl + Vwdr),$$

wherein Sc is the torsional amount corresponding value of the drive shaft showing the degree of torsion generated in the drive shaft, N3 is the rotating speed of the drive shaft, Vwdl is the rotating speed of a left drive wheel of the vehicle, Vwdr is the rotating speed of a right drive wheel of the vehicle, and Kdiff is a predetermined gear ratio of a differential gear of the vehicle.

Accordingly, the driving system vibration damping driving force feedback correcting value can be determined as a correcting value corresponding to the torsional amount corresponding value of the drive shaft when the driving system vibration damping driving force feedback correcting value is determined as a value corresponding to the detecting value of the rotating speed of each drive wheel and the detecting value of the rotating speed of the drive shaft in this way.

Accordingly, in this case, the driver request generation driving force value after the driving system vibration damping foreknowledge correction determined as a correcting value of the driver request generation driving force value for restraining the torsional vibration of the drive shaft can be obtained as a value corrected by the driving system vibration damping driving force feedback correcting value as a feedback correcting value corresponding to the torsional amount corresponding amount of the drive shaft corresponding to a control object amount intended to be restrained.

Namely, in this case, the driver request generation driving force value after the driving system vibration damping correction can be obtained as a very highly reliable value corresponding to the torsional amount corresponding amount (vehicle state) of the drive shaft corresponding to the object amount intended to be restrained.

In this case, the torsional vibration of the drive shaft is more suitably restrained since the driving force outputted from the driving system is controlled to correspond to the target generation driving force guide value set on the basis of this driver request generation driving force value after the driving system vibration damping correction.

On the other hand, in the vehicle integration control system of the invention, the target generation driving force guide value is a guide value of the driving force outputted from the driving system of the vehicle, as described above. With respect to "the driving force outputted from the driving system," which is also a control object of the driving system controller, it is not limited to a specific amount, but may be an amount corresponding to the driving force generated by the driving source realized as an engine, etc., and an amount corresponding to the driving force outputted to the drive shaft through a speed change gear from the driving source, and an amount corresponding to the driving force transmitted to the drive wheel through the drive shaft, etc. from the driving source.

Here, for example, when the target generation driving force guide value is a value corresponding to the driving force outputted to the drive shaft through the speed change gear from the driving source, the manager controller and the driving source controller may be also constructed as follows.

Namely, speed changing ratio detector for detecting the speed changing ratio of the speed change gear is first arranged in the vehicle integration control system of the invention. Further, the manager controller has driving source driving force determiner for determining a driving source driving force command value corresponding to the driving force outputted by the driving source on the basis of the target generation driving force command value and the speed changing ratio detected by the speed changing ratio detector. Further, the driving system controller is constructed to control the driving force outputted by the driving source on the basis of the driving source driving force command value determined by the driving source driving force determiner.

Accordingly, the output driving force of the driving source corresponding to the output driving force to the drive shaft suitable in restraining the vibration generated in the vehicle is outputted from the driving source and the vibration in the vehicle can be suitably restrained.

The manager controller in any one of the above vehicle integration control systems can be realized as a program for making a computer function.

In the case of such a program, for example, the program can be used by recording the program to a recording medium such as a flexible disk, an optical magnetic disk, a CD-ROM, a hard disk, a ROM, a RAM, etc. able to be read by the computer, and loading the program to the computer in accordance with necessity and starting the program. Further, the program can also be used by loading and starting the program through a network.

Embodiments applying the invention thereto will next be explained by using the drawings. The embodiments of the invention are not limited to the following embodiments, but various modes can be adopted as long as these modes belong to the technical scope of the invention.

Other features and advantages of the present invention will therefore be appreciated, as well as methods of operation and the function of the related parts from a study of the following detailed description, appended claims, and drawings, all of which form a part of this application. In the drawings:

DETAILED DESCRIPTION OF THE PREFERRED EMBODIMENTS

Figure 1:
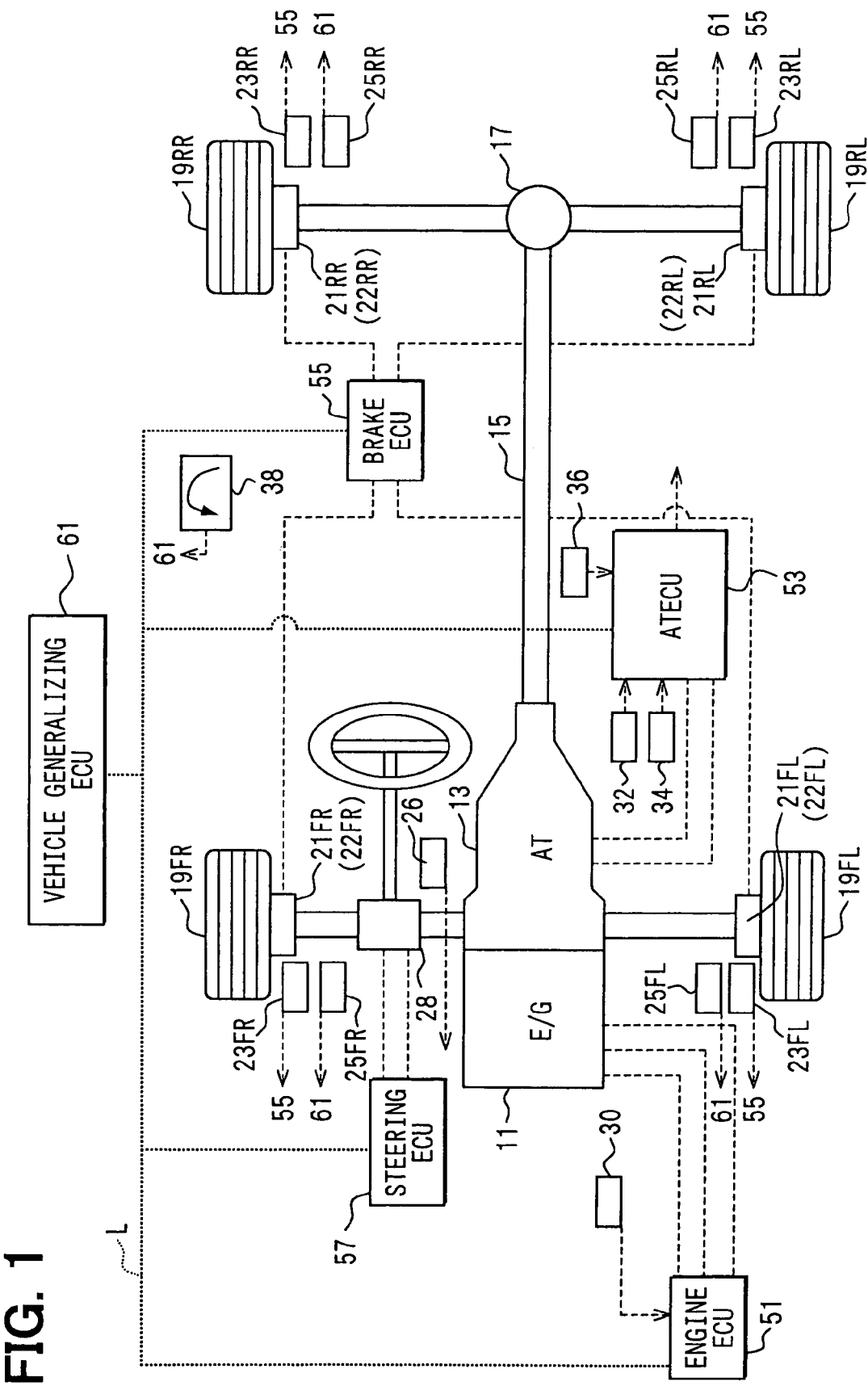
FIG. 1 is a block diagram of a vehicle integration control system according to one embodiment of the present invention.

FIG. 1 is a block diagram of a vehicle integration control system in accordance with one embodiment of the present invention. This embodiment shows an example in which the vehicle integration control system is applied to a vehicle having a front engine and a rear drive (FR) system.

As shown in FIG. 1, in this vehicle, a driving force generated by a driving source such as an engine 11 (internal combustion engine, etc.) is outputted to a drive shaft 15 through an automatic transmission 13 (hereinafter referred to as an "AT"). The driving force outputted to the drive shaft 15 is distributed to a left rear wheel 19RL and a right rear wheel 19RR (drive wheels) through a differential gear 17 such as a Limited Slip Differential (LSD), an operation limiting device, or some other similar device capable of serving the principles of the present invention.

Hydraulic type brake devices 21FL, 21FR, 21RL, 21RR for providing braking force to the rear wheels 19RR, 19RI and front wheels 19FR, 19FL are respectively arranged in the respective wheels. In this configuration, the front wheels 19FL, 19FR are driven wheels and the rear wheels 19RL, 19RR are drive wheels.

The brake devices 21 are operated on the basis of the operation of a brake pedal (not shown) using a driver and a control signal from a BRAKE ECU 55, which will be described later. Hydraulic sensors 22FL, 22FR, 22RL, 22RR for detecting the oil pressure within a device corresponding to the braking force provided by the brake devices 21 are respectively arranged therein.

Figure 9:
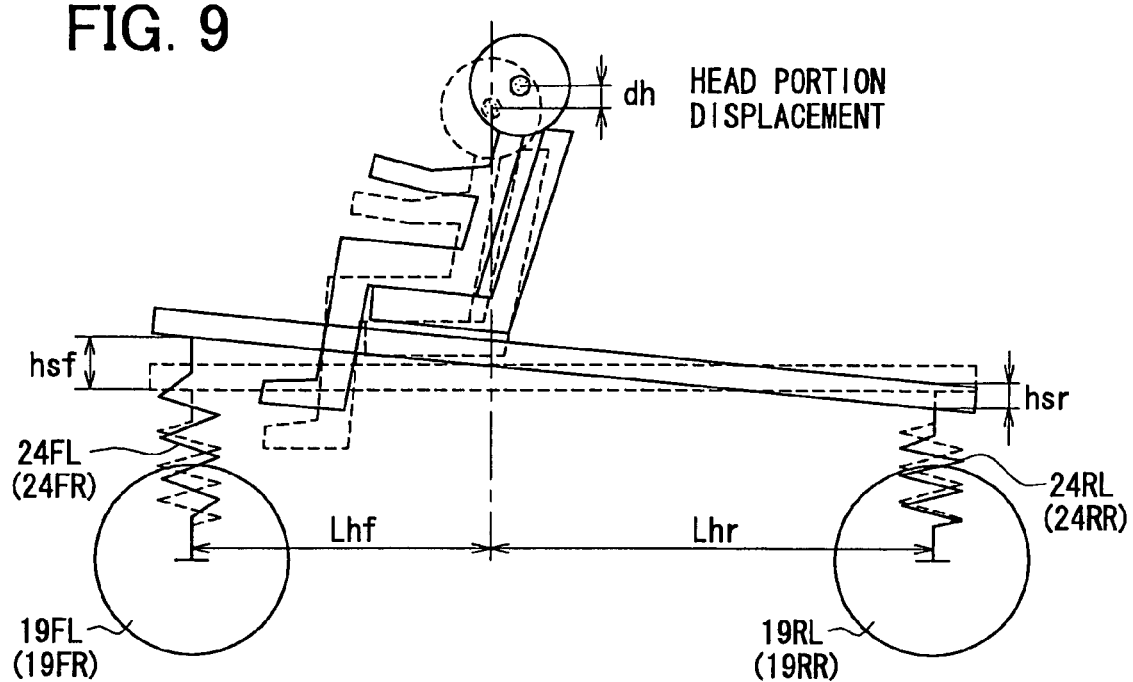
FIG. 9 is a side view of a simplified vehicle including a crewmember illustrating a relationship between suspension displacement amounts of front and rear wheels and a displacement amount of a head portion of the crewmember.

Furthermore, speed sensors 23FL, 23FR, 23RL, 23RR for detecting the rotational speeds of the wheels 19 are arranged therein. In addition, stroke sensors 25FL, 25FR, 25RL, 25RR for detecting an amount of displacement of suspension devices 24FL, 24FR, 24RL, 24RR such as suspension springs (see FIG. 9) are arranged in the respective wheels 19.

An ENGINE ECU 51, an ATECU 53, and a BRAKE ECU 55 for respectively controlling the operations of the engine 11, the AT 13, and the brake devices 21 are arranged in the vehicle. Furthermore, a STEERING ECU 57 is also arranged in the vehicle. The STEERING ECU 57 performs a power steering control operation by outputting a control signal to a motor 28 for changing an assist force. The assist force is applied during a steering angle changing time of the front wheels 19FL, 19FR, which are the steering wheels. The amount of assist force is determined on the basis of a steering angle δ of the front wheels 19FL, 19FR during the steering operation initiated by the driver and steering force detected by a steering force sensor (not shown). A steering angle sensor 26 detects the steering angle δ.

The ENGINE ECU 51 inputs a detecting signal received from an accelerator aperture sensor 30, which detects a depression of an accelerator pedal by the driver.

The ATECU 53 inputs a detecting signal received from a shift position switch (not shown) for detecting the operating position (shift position) of a shift lever (not shown), which is operated by the driver. Furthermore, the ATECU 53 inputs detecting signals received from a rotating speed sensor 32, a rotating speed sensor 34, and a rotating speed sensor 36. The rotating speed sensor 32 detects a rotating speed of an input shaft of a torque converter of the AT 13. The rotating speed sensor 34 detects a rotating speed of an output shaft (in other words, the input shaft of a secondary speed change gear as a constructional element of the AT 13) of the torque converter. The rotating speed sensor 36 detects a rotating speed of the output shaft (in other words, the drive shaft 15) of the secondary speed change gear.

The BRAKE ECU 55 inputs detecting signals from speed sensors 23FL to 23RR, stroke sensors 25FL to 25RR, a yaw rate sensor 38, a master cylinder pressure sensor (not shown), and hydraulic sensors 22FL to 22RR. The yaw rate sensor 38 detects a yaw rate of the vehicle. The master cylinder pumps brake-fluid in accordance with a brake pedal operation of the driver.

Furthermore, the vehicle of the present embodiment includes a VEHICLE GENERALIZING ECU 61 for transmitting operation guide information to the above ENGINE ECU 51, the ATECU 53, the BRAKE ECU 55, and the STEERING ECU 57.

It should be appreciated that the VEHICLE GENERALIZING ECU 61 and the other ECUs 51, 53, 55, 57 function as main constructional elements of the vehicle integration control system of this embodiment.

In general, the VEHICLE GENERALIZING ECU 61 generates the operation guide information with respect to each constructional element of the vehicle on the basis of each of the values detected by each of the above-described sensors for specifying a vehicle state to be inputted through a signal line L that provides communication between each of the ECUs 51, 53, 55, 57, 61 including the VEHICLE GENERALIZING ECU 61 and each of the ECUs 51, 53, 55, 57 except for the VEHICLE GENERALIZING ECU 61. The VEHICLE GENERALIZING ECU 61 then sends out the operation guide information to each of the ECUs 51, 53, 55, 57. In this vehicle, optimum control is realized by this construction as a whole of the vehicle.

Each of the ECUs 51, 53, 55, 57, 61 is constructed as an electronic controller with a microcomputer having a CPU, a ROM, a RAM, etc.

Control processing executed in each of these ECUs 51, 53, 55, 57, 61, etc. will next be explained.

First, in this vehicle, it should be understood that various ECUs (not shown) relating to air conditioning within a cabin of the vehicle, body electronics, etc. are provided in addition to each of the above-described ECUs 51, 53, 55, 57, 61.

Figure 2:
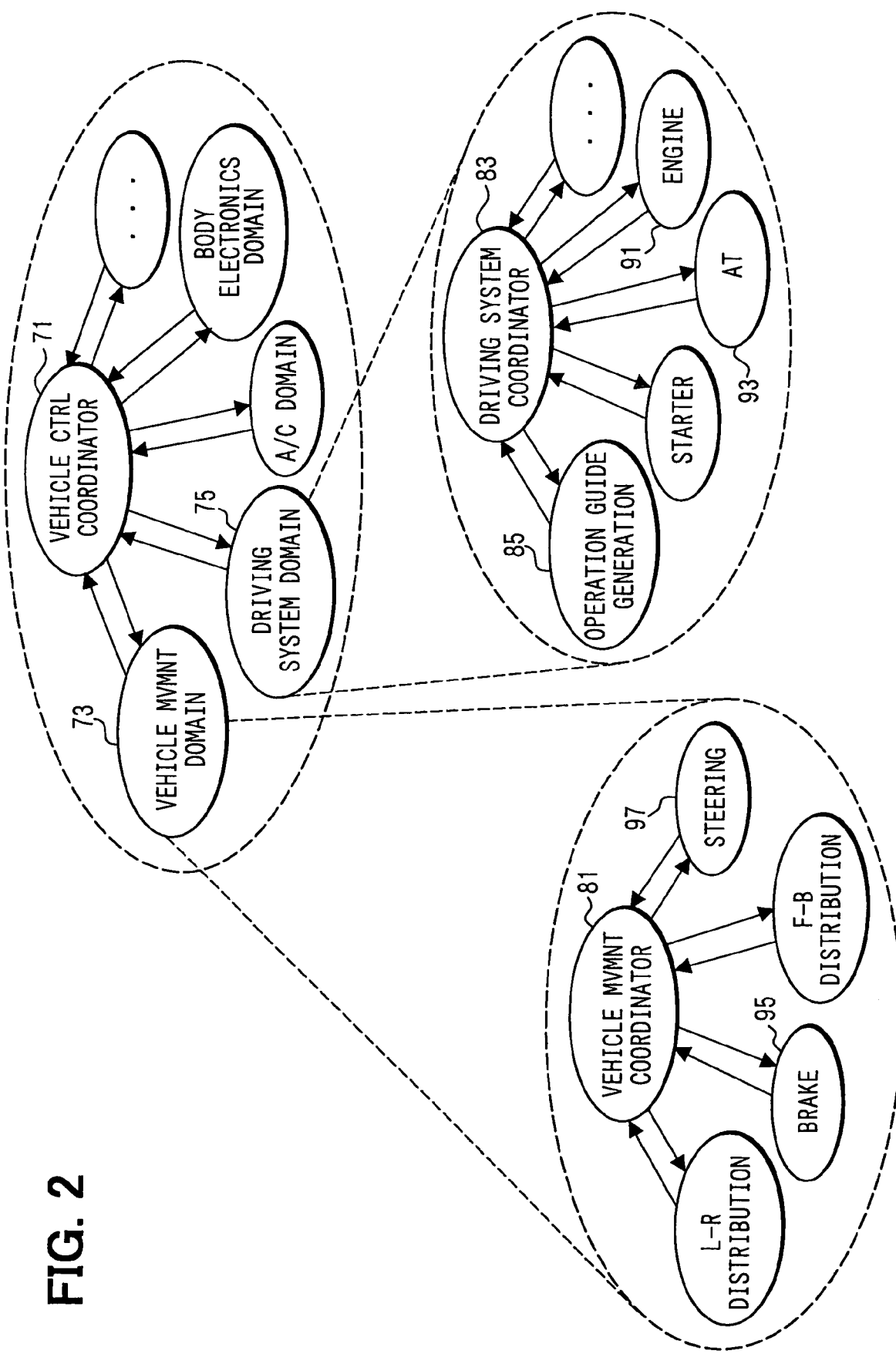
FIG. 2 is a schematic diagram of a functional construction of the vehicle integration control system of FIG. 1.

In the vehicle integration control system of this embodiment with all these ECUs as main constructional elements, the control processing is functionally executed according to the diagram of FIG. 2.

Namely, the electronic control of the vehicle is divided into domains including but not limited to a vehicle movement domain 73 and a driving system domain 75. These domains provide for movement of the vehicle, driving the vehicle, air conditioning within the vehicle cabin, body electronics, electric energy, and other functions desired to be undertaken. The vehicle integration control system is constructed such that respective control systems including an engine component 91, a transmission component (AT component 93 in this embodiment), a brake component 95, and a steering component 97 are arranged within the above-described domains. The operations of these control systems are provided according to the connections shown in FIG. 2. Accordingly, for example, it is not allowed that the operation of the engine 11 is directly adjusted by brake control 95a (see FIG. 3) within the brake component 95 for controlling the operations of the brake devices 21. Namely, the operation of the engine 11 is adjusted, if necessary, after a VEHICLE MOVEMENT COORDINATOR 81, a VEHICLE CONTROL COORDINATOR 71, and a DRIVING SYSTEM COORDINATOR 83 perform operations in accordance with values detected by the hydraulic sensors 22 of the brake devices 21. However, only information for prescribing the operation of each component is transmitted in a path shown by an arrow in FIG. 2. For example, general information including the values detected by each of the above sensors in the vehicle control such as the engine rotating speed and the rotating speed of each of the wheels 19 is freely communicated a first component that calculates this information and a second component that requires this information without being restrained to the connections shown in FIG. 2. The general information is calculated by a component having a relationship close to this information. For example, the engine rotating speed is calculated by the engine component 91, which includes the engine 11 and the engine control 91a. The rotating speed of each of the wheels 19 is calculated by the brake component 95, which includes the brake devices 21 and the brake control 95a. A driving system torque relating to all of the operations of the engine 11, the AT 13, etc. is calculated by the DRIVING SYSTEM COORDINATOR 83.

Figure 3:
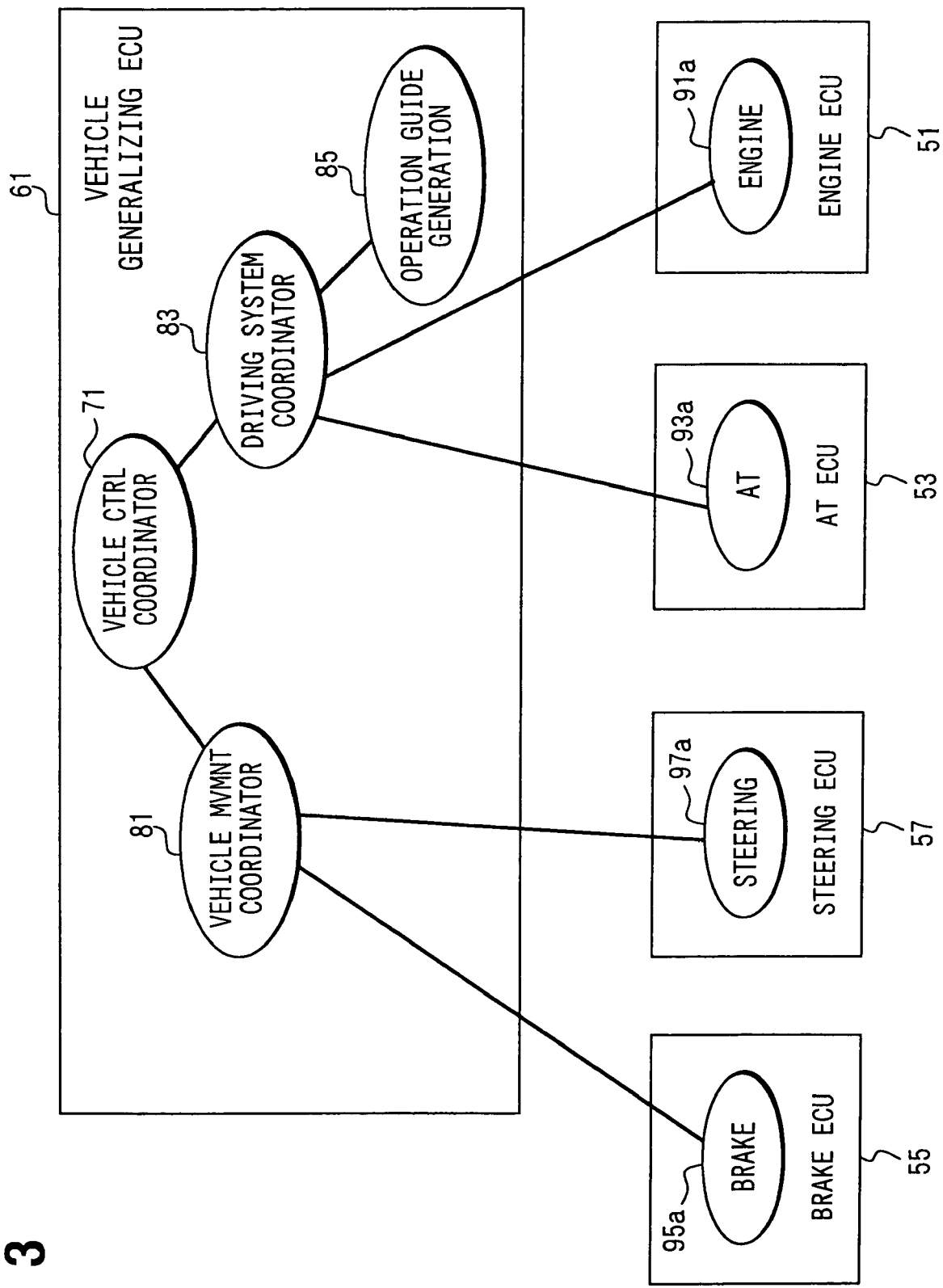
FIG. 3 is a schematic diagram of a control process executed by an ECU of the vehicle integration control system of FIG. 1.

In the members shown in FIG. 2, the VEHICLE CONTROL COORDINATOR 71, the VEHICLE MOVEMENT COORDINATOR 81, the DRIVING SYSTEM COORDINATOR 83, a DRIVING SYSTEM OPERATION GUIDE GENERATING COMPONENT 85, the engine control 91a, which is a constructional element of the engine component 91, a steering control 97a, which is a constructional element of the steering component 97, and the brake control 95a, which is a constructional element of the brake component 95 shown in FIG. 3 particularly relate to this embodiment. A function for setting basic generation driving force for running the vehicle in this embodiment is arranged in the DRIVING SYSTEM OPERATION GUIDE GENERATING COMPONENT 85. A function for adjusting the driving system generation driving force set here in accordance with situations is appropriately dispersed and arranged in the DRIVING SYSTEM COORDINATOR 83, the VEHICLE CONTROL COORDINATOR 71, and the VEHICLE MOVEMENT COORDINATOR 81. Driving source generation driving force (engine driving force) is set to be realized as a result of these adjustments and is outputted to the engine component 91. The engine component 91 executes actuator driving for realizing this driving source generation driving force. Furthermore, the brake device and the steering device are operated by the brake component 95 including the brake control 95a and the steering component 97 including the steering control 97a. These devices are connected to the VEHICLE MOVEMENT COORDINATOR 81 and an appropriate driving source generation driving force is set on the basis of information from these components.

The relation of a member particularly relating to the vehicle integration control system of this embodiment for suitably restraining vibration generated in the vehicle by controlling the driving force outputted by the engine 11 in the respective elements shown in FIG. 2, and each of the ECUs 51, 53, 55, 57, 61 shown in FIG. 1 will next be explained with reference to FIG. 3.

FIG. 3 is a schematic diagram of control processes executed by each of the ECUs 51, 53, 55, 57, and 61. As shown in this figure, the engine control 91a included in the engine component 91 is mounted to the ENGINE ECU 51 for controlling the operation of the engine 11. The brake control 95a included in the brake component 95 is mounted to the BRAKE ECU 55 for controlling the operations of the brake devices 21. The steering control 97a included in the steering component 97 is mounted to the STEERING ECU 57 for controlling the operation of the motor 28. The DRIVING SYSTEM OPERATION GUIDE GENERATING COMPONENT 85, DRIVING SYSTEM COORDINATOR 83, VEHICLE CONTROL COORDINATOR 71, and VEHICLE MOVEMENT COORDINATOR 81 are each mounted to the VEHICLE GENERALIZING ECU 61. A network connects these systems. Other ECUs such as the ATECU 53 for controlling the operation of the AT 13 and AT control 93a included in the AT component 93 (transmission component) are also connected to this network.

In this construction, information for the vehicle control detected by each of the controls 91a, 93a, 95a, 97a is inputted to the VEHICLE GENERALIZING ECU 61. The information is then communicated between the respective constructional elements within the VEHICLE GENERALIZING ECU 61 that require this information.

For example, the information for the vehicle control is sent out from each control and is inputted to the VEHICLE GENERALIZING ECU 61 as follows.

First, the engine control 91a calculates the depression (accelerator pedal aperture a) of the accelerator pedal on the basis of the signal received from the accelerator aperture sensor 30. The engine control 91a then sends this depression to the VEHICLE GENERALIZING ECU 61.

Based on detecting signals from the rotating speed sensors 32, 34, 36, the rotating speeds N1, N2, N3 of the shafts are calculated and sent to the VEHICLE GENERALIZING ECU 61 by the AT control 93a. A speed changing ratio using the AT 13 may be calculated on the basis of a signal from a shift position switch, etc., and may also be sent out to the VEHICLE GENERALIZING ECU 61 by the AT control 93a.

Oil pressures Pfl, Pfr, Prl, Prr within the brake devices 21 and rotating speeds Vwsl, Vwsr, Vwdl, Vwdr of the respective wheels 19 are calculated on the basis of signals from the hydraulic sensors 22 and the speed sensors 23. This information is then sent to the VEHICLE GENERALIZING ECU 61 by the brake control 95a.

Furthermore, the steering angle δ according to a steering operation performed by a driver is calculated on the basis of a signal detected by the steering angle sensor 26. The steering angle δ is then sent to the VEHICLE GENERALIZING ECU 61 by the steering control 97a.

Displacement amounts Hsfl, Hsfr, Hsrl, Hsrr of the suspension devices 24 and a yaw rate γ of the vehicle are calculated by the VEHICLE GENERALIZING ECU 61 on the basis of signals detected by the stroke sensors 25 and the yaw rate sensor 38.

In the VEHICLE GENERALIZING ECU 61, the VEHICLE CONTROL COORDINATOR 71 performs A control process using the VEHICLE MOVEMENT COORDINATOR 81 and the DRIVING SYSTEM COORDINATOR 83 according to information received from each of the above controls 91a, 93a, 95a, 97a and information calculated by the VEHICLE GENERALIZING ECU 61. As will be described later, an engine driving force command value to be outputted to the engine control 91a is set by this control process as operation guide information (a guide value) relating to the driving force of the engine 11 suitable for the restraint of vibrations in the vehicle. Next, the driving force of the engine 11 is controlled by the engine control 91a on the basis of this engine driving force command value.

The schematic contents of the above-described control processing will next be explained with reference to FIG. 4.

Figure 4:
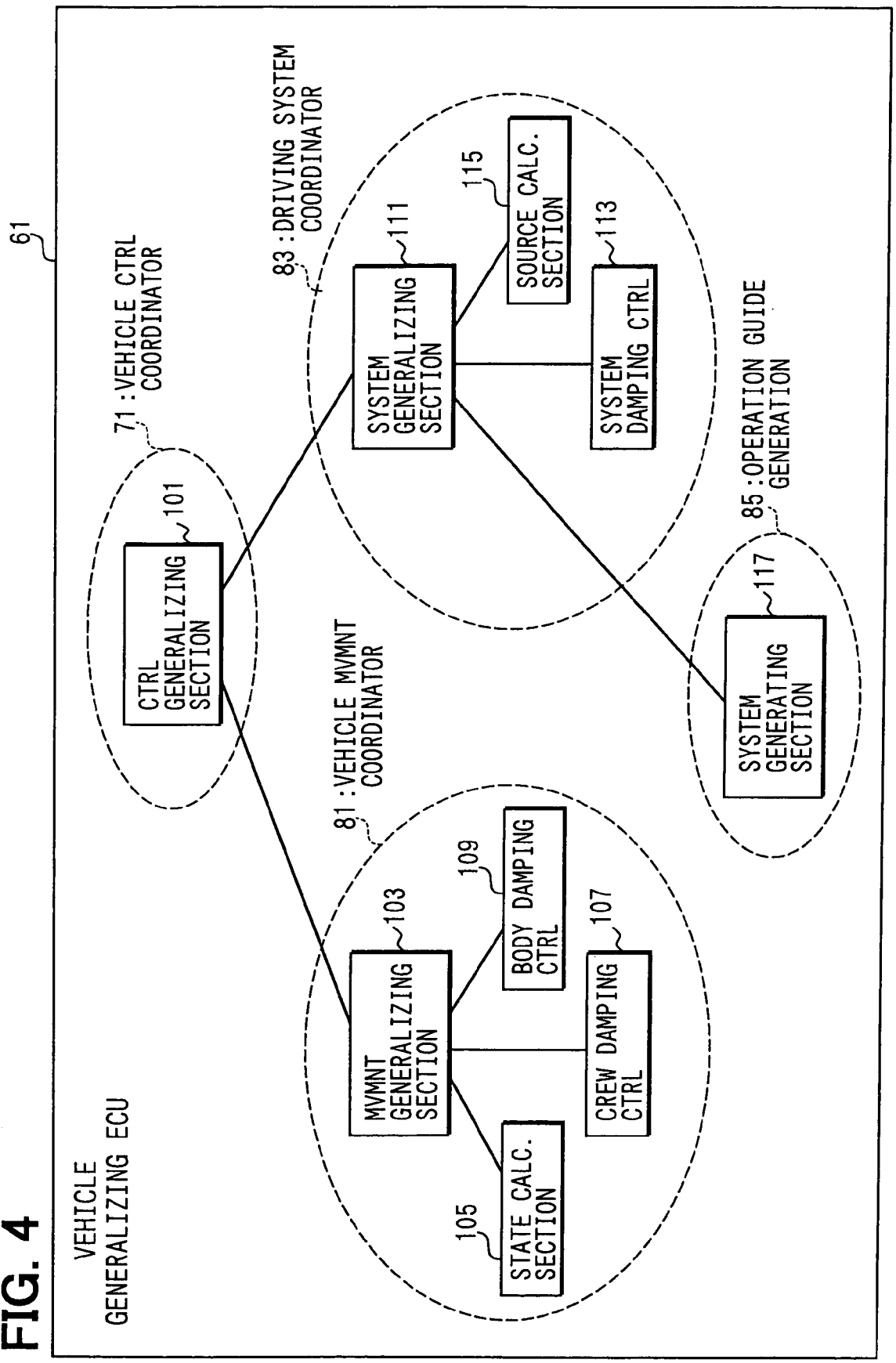
FIG. 4 is a schematic diagram of a process executed by a vehicle generalizing ECU of the vehicle integration control system of FIG. 1.

FIG. 4 is a schematic diagram of a control process executed by the VEHICLE GENERALIZING ECU 61. As described above, the VEHICLE CONTROL COORDINATOR 71, the VEHICLE MOVEMENT COORDINATOR 81, the DRIVING SYSTEM COORDINATOR 83 and the DRIVING SYSTEM OPERATION GUIDE GENERATING COMPONENT 85 are arranged within the VEHICLE GENERALIZING ECU 61. As shown in FIG. 4, a vehicle control generalizing section 101 is arranged within the VEHICLE CONTROL COORDINATOR 71. Furthermore, a vehicle movement generalizing section 103, a vehicle state calculating section 105, a crewmember vibration damping control section 107, and a vehicle body vibration damping control section 109 are arranged within the VEHICLE MOVEMENT COORDINATOR 81. A driving system generalizing section 111, a driving system vibration damping control section 113, and a driving source operation guide calculating section 115 are arranged within the DRIVING SYSTEM COORDINATOR 83. Further yet, a driving system operation guide generating section 117 is arranged within the DRIVING SYSTEM OPERATION GUIDE GENERATING COMPONENT 85.

In the above sections, the vehicle control generalizing section 101 of the VEHICLE CONTROL COORDINATOR 71 is connected to the vehicle movement generalizing section 103 of the VEHICLE MOVEMENT COORDINATOR 81 and the driving system generalizing section 111 of the DRIVING SYSTEM COORDINATOR 83. The vehicle control generalizing section 101 controls the communication of information between each section within the VEHICLE MOVEMENT COORDINATOR 81 and each section within the DRIVING SYSTEM COORDINATOR 83 to set the generation driving force of the driving system including a visual point of the vehicle movement.

The vehicle movement generalizing section 103 of the VEHICLE MOVEMENT COORDINATOR 81 controls communication of information between the exterior of the VEHICLE MOVEMENT COORDINATOR 81, the vehicle state calculating section 105, the crewmember vibration damping control section 107, and the vehicle body vibration damping control section 109 of the VEHICLE MOVEMENT COORDINATOR 81 to calculate a correcting value based on the visual point of the vehicle movement of a driver request generation driving force value according to the accelerator pedal operation performed by a driver.

The vehicle state calculating section 105 calculates a moving state of the vehicle and a numerical value showing force applied to each portion of the vehicle, as well as other values in accordance with the operating signals of the steering and brake devices 21FL to 21RR, other operating signals, and the above-described various kinds of sensor detected values.

The crewmember vibration damping control section 107 calculates a correcting value of the driver request generation driving force value for restraining the displacement of the head portion of the driver to prevent the driver from becoming uncomfortable. Furthermore, the vehicle body vibration damping control section 109 calculates the correcting value of the driver request generation driving force value such that no vehicle behavior becomes unstable by changing a ground load in each wheel.

The driving system generalizing section 111 of the DRIVING SYSTEM COORDINATOR 83 controls communication of information between the VEHICLE CONTROL COORDINATOR 71, the driving system operation guide generating section 117 located outside the DRIVING SYSTEM COORDINATOR 83, the driving system vibration damping control section 113, and the driving source operation guide calculating section 115 located within the DRIVING SYSTEM COORDINATOR 83 to set the driver request generation driving force value to an appropriate value including the visual point of the vehicle movement. The driving system vibration damping control section 113 calculates the corrected value (a value after the correction) of the driver request generation driving force value to restrain torsional vibration generated in the drive shaft 15 and prevent the driving force change due to an external disturbance applied from the exterior through the wheels. Furthermore, the driving source operation guide calculating section 115 calculates an engine driving force command value as a guide value corresponding to the driving force to be outputted from the engine 11 in accordance with the operating state of another driving system constructional element such as the transmission (AT 13) on the basis of the value (a target generation driving force command value) after the correction of the driver request generation driving force value reflecting each of the above various kinds of correcting values.

Further yet, the driving system operation guide generating section 117 of the DRIVING SYSTEM OPERATION GUIDE GENERATING COMPONENT 85 sets an appropriate driver request generation driving force value in accordance with the accelerator pedal operation performed by the driver.

Next, a driving system driving force control process as one of the control processings repeatedly executed by a CPU as a constructional element of the VEHICLE GENERALIZING ECU 61 at the vehicle running time on the basis of a program stored in a ROM within this VEHICLE GENERALIZING ECU 61 will be explained in detail with reference to FIGS. 5 to 20.

Figure 5:
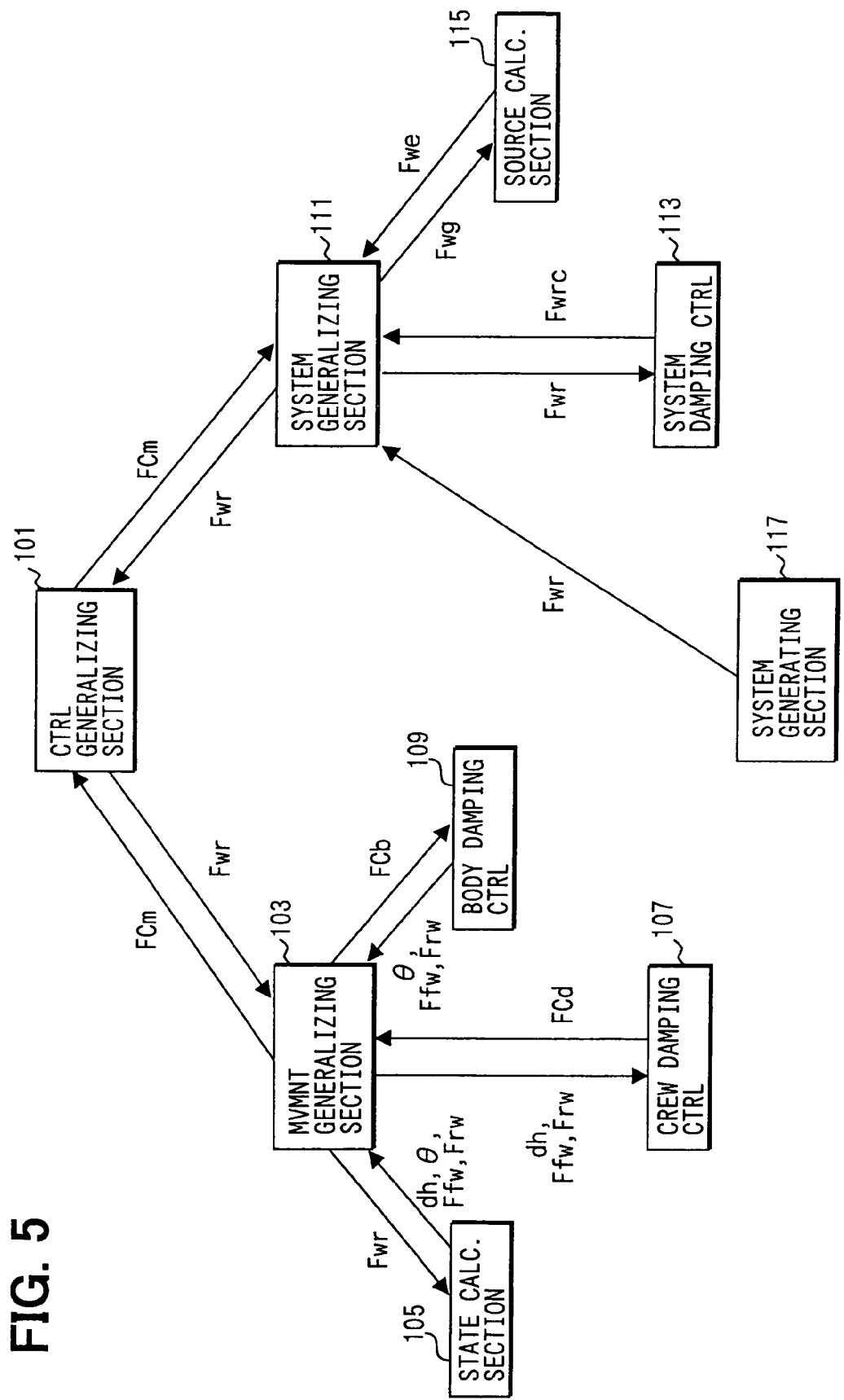
FIG. 5 is a schematic diagram illustrating a flow of information between a plurality of constructional elements of the ECU of FIG. 4.

FIG. 5 is an schematic diagram showing the contents of information being delivered between the respective constructional elements shown in FIG. 4. First, processing executed in the vehicle control generalizing section 101 will be explained on the basis of the flowcharts shown in FIGS. 5 and 6.

Figure 6:
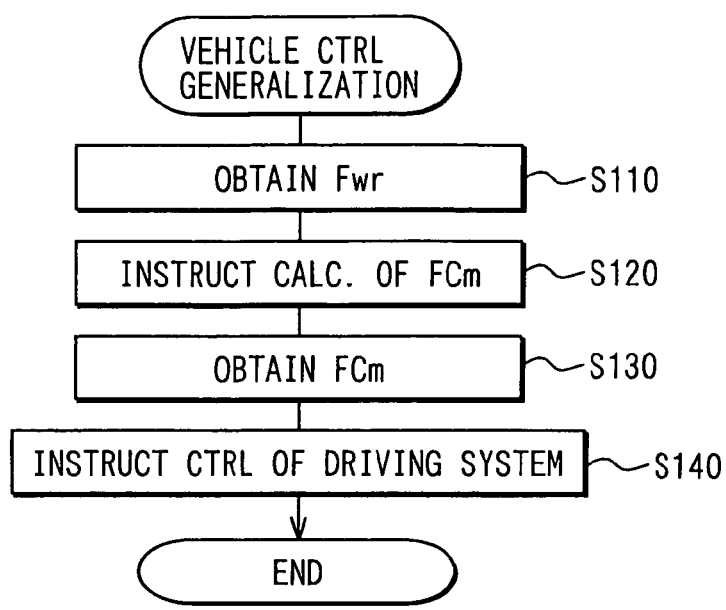
FIG. 6 is a flowchart of a process executed by a vehicle control generalizing section of the vehicle integration control system of FIG. 1.

As shown in FIG. 6, the vehicle control generalizing section 101 first obtains a driver request generation driving force value Fwr from the driving system generalizing section 111 in step S110. As will be described later, the driver request generation driving force value Fwr is calculated by the driving system operation guide generating section 117 during processing (S820), which will be described later.

Then, in step S120, instructions of the calculation of a vehicle movement vibration damping driving force correcting value FCm (described later) are given to the vehicle movement generalizing section 103. Concretely, for example, the driver request generation driving force value Fwr obtained in S110 is transmitted to the vehicle movement generalizing section 103. Thus, the calculation of the vehicle movement vibration damping driving force correcting value FCm corresponding to the driver request generation driving force value Fwr is instructed (see FIG. 5).

Next, in step S130, the vehicle movement vibration damping driving force correcting value FCm is obtained from the vehicle movement generalizing section 103 as a reply to the calculation instructions performed in S120 (see FIG. 5).

In step S140, the vehicle movement vibration damping driving force correcting value FCm obtained in S130 is transmitted to the driving system generalizing section 111 (see FIG. 5). Thus, instructions reflecting the vehicle movement vibration damping driving force correcting value FCm are given to the driving system generalizing section 111 and the processing by the vehicle control generalizing section 101 is terminated.

Next, processing executed by the vehicle movement generalizing section 103 will be explained with reference to FIGS. 5 and 7.

Figure 7:
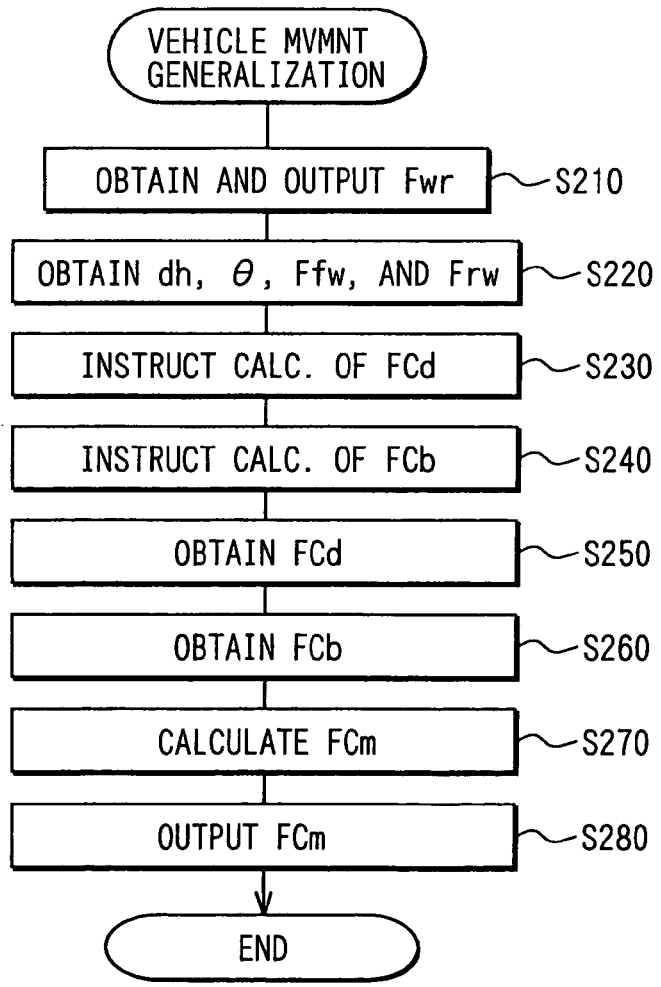
FIG. 7 is a flowchart of a process executed by a vehicle movement generalizing section of the vehicle integration control system of FIG. 1.

As shown in FIG. 7, in the vehicle movement generalizing section 103, the driver request generation driving force value Fwr is first obtained from the vehicle control generalizing section 101 as the calculation instructions of the vehicle movement vibration damping driving force correcting value FCm from the vehicle control generalizing section 101 in S210. Furthermore, in step S210, this driver request generation driving force value Fwr is outputted to the vehicle state calculating section 105 as calculation instructions of the vehicle state information with respect to the vehicle state calculating section 105 (see FIG. 5).

Next, in step S220, the vehicle state information (a crewmember head portion displacement amount dh, a vehicle body pitch angle θ, a front wheel vehicle body forward-backward force Ffw, and a rear wheel vehicle body forward-backward force Frw) calculated by the vehicle state calculating section 105 is obtained from the vehicle state calculating section 105.

Next, in step S230, instructions regarding the calculation of a crewmember vibration damping driving force correcting value FCd, which will be described later, are given to the crewmember vibration damping control section 107. Concretely, the crewmember head portion displacement amount dh, the front wheel vehicle body forward-backward force Ffw, and the rear wheel vehicle body forward-backward force Frw among the vehicle state information obtained in S220 are sent to the crewmember vibration damping control section 107 (see FIG. 5). Thus, the calculation of the crewmember vibration damping driving force correcting value FCd corresponding to these sent-out information is instructed.

Further, in step S240, instructions of the calculation of a vehicle body vibration damping driving force correcting value FCb (described later) are given to the vehicle body vibration damping control section 109. Concretely, the vehicle body pitch angle θ, the front wheel vehicle body forward-backward force Ffw, and the rear wheel vehicle body forward-backward force Frw among the vehicle state information obtained in step S220 are sent out to the vehicle body vibration damping control section 109 (see FIG. 5). Thus, the calculation of the vehicle body vibration damping driving force correcting value FCb corresponding to this sent-out information is instructed.

Next, in step S250, the crewmember vibration damping driving force correcting value FCd is obtained from the crewmember vibration damping control section 107 as a reply to the calculation instructions given in step S230 (see FIG. 5). Further, in step S260, the vehicle body vibration damping driving force correcting value FCb is obtained from the vehicle body vibration damping control section 109 as a reply to the calculation instructions given in step S240 (see FIG. 5).

Next, in step S270, the crewmember vibration damping driving force correcting value FCd obtained in step S250 and the vehicle body vibration damping driving force correcting value FCb obtained in step S260 are added as shown in the following formula (1) so that the vehicle movement vibration damping driving force correcting value FCm is calculated.

$$FCm = FCd + FCb \qquad (1)$$

In step S280, the processing in the vehicle movement generalizing section 103 is terminated by outputting the vehicle movement vibration damping driving force correcting value FCm calculated in step S270 to the vehicle control generalizing section 101 (see FIG. 5).

Next, a process executed by the vehicle state calculating section 105 will be explained with reference to FIGS. 5, 8, 9 and 10.

Figure 8:
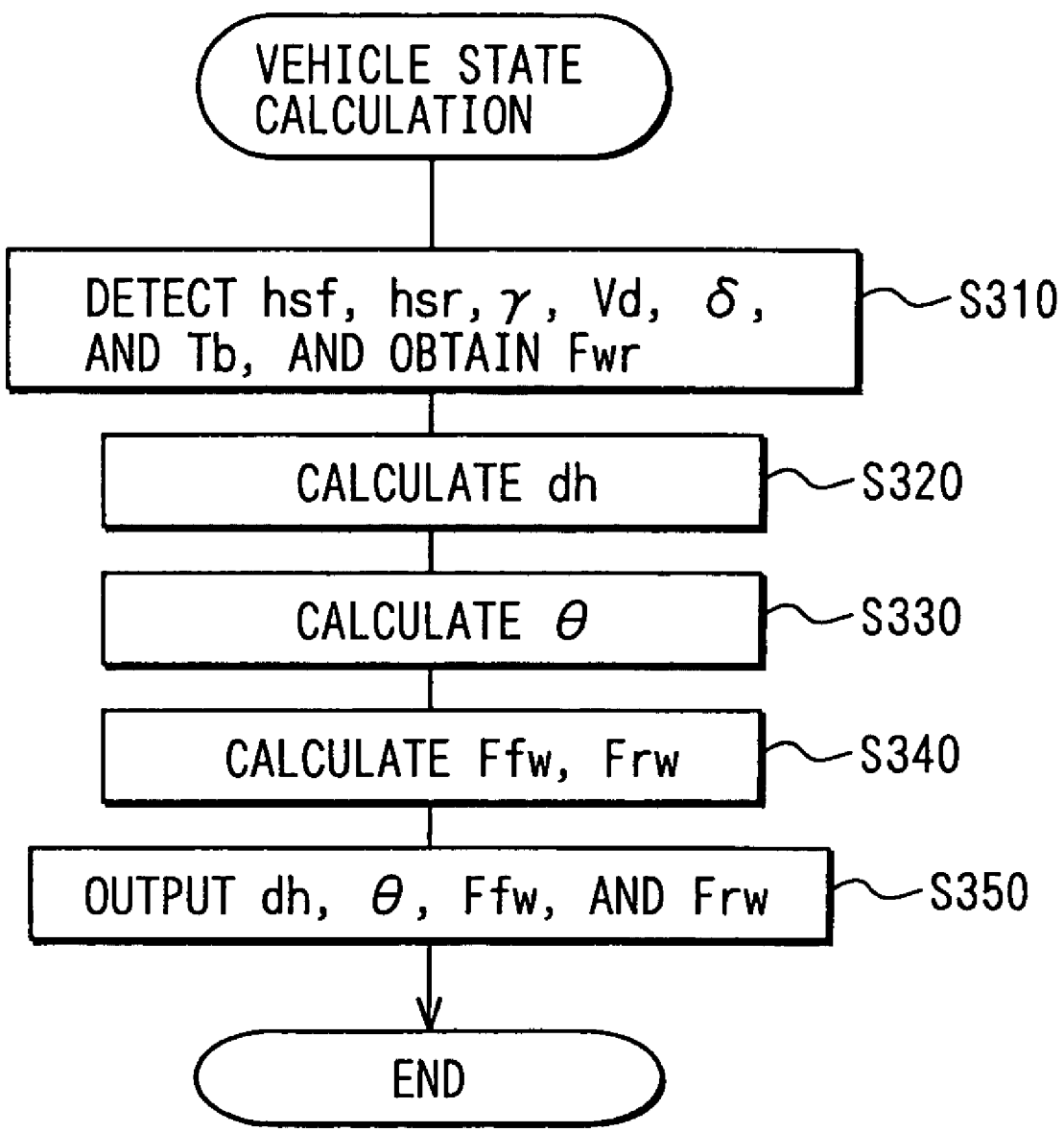
FIG. 8 is a flowchart of a process executed by a vehicle state calculating section of the vehicle integration control system of FIG. 1.

As shown in FIG. 8, in step S310, a suspension stroke amount hsf of the front wheel, a suspension stroke amount hsr of the rear wheel, the yaw rate γ of the vehicle, the vehicle body speed Vd, the steering angle δ, and the sum Tb of brake torques applied to the two rear wheels 19RL, 19RR are first detected in the vehicle state calculating section 105 and the driver request generation driving force value Fwr is obtained.

Concretely, the suspension stroke amount hsf of the front wheel is determined by calculating the average value of a suspension displacement amount Hsfl of the suspension device 24FL arranged in the left front wheel 19FL and a suspension displacement amount Hsfr of the suspension device 24FR arranged in the right front wheel 19FR, both of which are calculated by the VEHICLE GENERALIZING ECU 61 on the basis of the detected signals inputted from the stroke sensors 25FL, 25FR with this average value as the suspension stroke amount hsf of the front wheel.

Further, for example, the suspension stroke amount hsr of the rear wheel is determined by calculating the average value of a displacing amount Hsrl of the suspension device 24RL arranged in the left rear wheel 19RL and a displacing amount Hsrr of the suspension device 24RR arranged in the right rear wheel 19RR, both of which are calculated by the VEHICLE GENERALIZING ECU 61 on the basis of detecting signals inputted from the stroke sensors 25RL, 25RR with this average value as the suspension stroke amount hsr of the rear wheel.

The yaw rate $\gamma$ of the vehicle is determined by a calculation by the VEHICLE GENERALIZING ECU 61 based on a detecting signal inputted from the yaw rate sensor 38.

For example, the vehicle body speed Vd is determined by inputting the rotating speed Vwsr of the right side driven wheel 19FR and the rotating speed Vwsl of the left side driven wheel 19FL from the BRAKE ECU 55 (brake control 95$a$) and calculating an average value of these rotating speeds Vwsr, Vwsl as the vehicle body speed Vd.

The steering angle $\delta$ is determined by inputting this steering angle $\delta$ from the STEERING ECU 57 (steering control 97$a$).

The sum Tb of the brake torques applied to the two rear wheels 19RL, 19RR is determined by inputting oil pressure Prl into the brake device 21RL for providing braking force to the left rear wheel 19RL and oil pressure Prr into the brake device 21RR for providing braking force to the right rear wheel 19RR from the BRAKE ECU 55 (brake control 95$a$) and calculating the sum Tb of the brake torques applied to the two rear wheels 19RL, 19RR by the brake devices 21RL, 21RR on the basis of these oil pressures Prl, Prr. For example, this sum Tb of the brake torques may also be calculated on the basis of map data showing the relationship of the oil pressures Prl, Prr and the sum Tb of the brake torques and stored in a ROM of the VEHICLE GENERALIZING ECU 61 in advance.

The driver request generation driving force value Fwr is obtained by inputting the driver request generation driving force value Fwr calculated by the driving system operation guide generating section 117 via the driving system generalizing section 111, the vehicle control generalizing section 101, and the vehicle movement generalizing section 103 as described later (see FIG. 5).

Next, in step S320, the crewmember head portion displacement amount dh representing a vertical direction movement amount of the head portion position of the driver of the vehicle is calculated on the basis of the suspension stroke amounts hsf, hsr of the front and rear wheels detected in step S310.

Concretely, for example, the crewmember head portion displacement amount dh is calculated on the basis of formula (2) provided below according to a model (see FIG. 9) set by using the sitting height of an average person and a seat position determined in advance.

$$dh=(hsf \cdot Lhr+hsr \cdot Lhf)/(Lhf+Lhr) \qquad (2)$$

wherein, Lhf and Lhr are predetermined constants, and Lhf is the distance in the forward-backward direction from the head portion position of the driver to the positions of the suspension devices 24FL, 24FR of the front wheels 19FL, 19FR. Lhr is the distance in the forward-backward direction from the head portion position of the driver to the positions of the suspension devices 24RL, 24RR of the rear wheels 19RL, 19RR.

Next, in step S330, the vehicle body pitch angle $\theta$ is calculated on the basis of the suspension stroke amounts hsf, hsr of the front and rear wheels detected in step S310.

Figure 10:
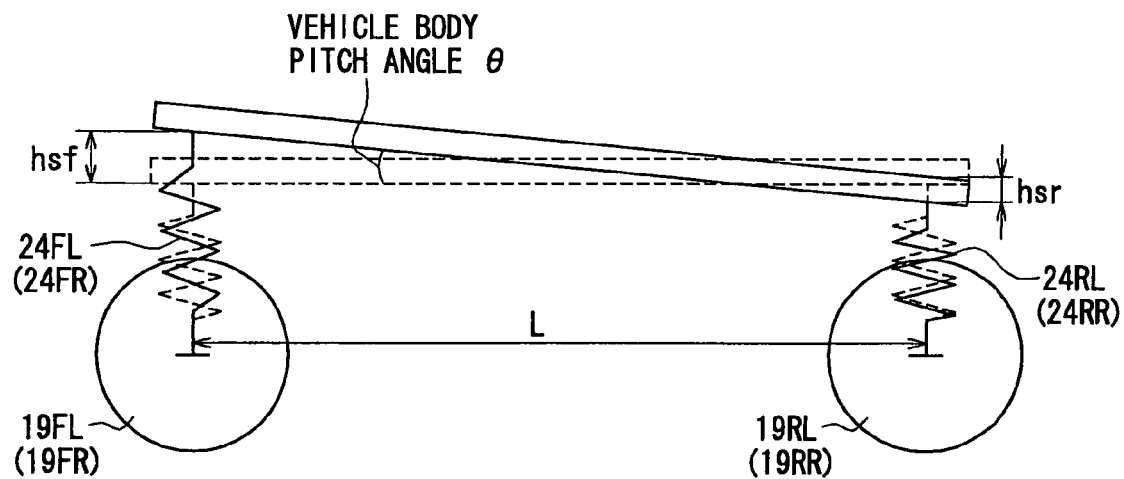
FIG. 10 is a side view of the simplified vehicle of FIG. 9 illustrating a relationship between the suspension displacement amounts of the front and rear wheels and a pitch angle of the vehicle.

Concretely, for example, the vehicle body pitch angle $\theta$ is calculated on the basis of formula (3) provided below under the supposition that the vehicle body pitch angle $\theta$ is a small angle (see FIG. 10).

$$\theta=(hsf-hsr)/L \qquad (3)$$

wherein, L is the predetermined length (constant) between the positions of the suspension devices 24FL, 24FR arranged in the front wheels 19FL, 19FR and the positions of the suspension devices 24RL, 24RR arranged in the rear wheels 19RL, 19RR.

Next, in step S340, the front wheel vehicle body forward-backward force Ffw representing a sum total of reaction forces in the vehicle body forward-backward direction applied to the tire grounding faces of the front wheels 19FL, 19FR of the vehicle is calculated. Additionally, the rear wheel vehicle body forward-backward force Frw representing a sum total of reaction forces in the vehicle body forward-backward direction applied to the tire grounding faces of the rear wheels 19RL, 19RR of the vehicle is calculated.

For example, these calculations done according to formulas (4) to (9) provided below, which are based on the supposition that a vehicle gravity center point sideslip angle $\beta$ and the sideslip angle of each wheel are small.

Concretely, when these calculations are made, a vehicle gravity center point sideslip angular velocity $d\beta/dt$ is first calculated on the basis of the formula (4) provided below based on the yaw rate $\gamma$ and the vehicle body speed Vd detected in step S310.

$$d\beta/dt=(Fyf(n-1)+Fyr(n-1))/(M \cdot Vd)-\gamma \qquad (4)$$

wherein, M represents a predetermined vehicle weight and Fyf(n–1 represents a front wheel lateral force as a sum total of lateral forces applied to the respective front wheels 19FL, 19FR. Furthermore, Fyr(n–1) represents a rear wheel lateral force as a sum total of lateral forces applied to the respective rear wheels 19RL, 19RR. (n–1) within Fyf(n–1) and Fyr(n–1) represents a value calculated in the previous arithmetic timing of step S340 described above.

Next, the vehicle gravity center point sideslip angle $\beta$ is calculated on the basis of the formula (5) provided below according to the vehicle gravity center point sideslip angular velocity $d\beta/dt$ calculated as described above.

$$\beta=\beta(n-1)+d\beta/dt \cdot Ts \qquad (5)$$

wherein, $\beta(n-1)$ represents the vehicle gravity center point sideslip angle calculated in the previous arithmetic timing of step S340 described above and Ts represents an arithmetic period (i.e., time until the arithmetic operation based on the formula (5) is performed in step S340 of the present flow after the arithmetic operation based on formula (5) is performed step S340 of the previous flow).

Next, the front wheel lateral force Fyf representing a sum total of the lateral forces applied to the respective front wheels 19FL, 19FR is calculated on the basis of the formula (6) provided below according to the vehicle gravity center point sideslip angle $\beta$ calculated in the above-described formula (5), the yaw rate $\gamma$, the vehicle body speed Vd, and the steering angle $\delta$ detected in step S310.

$$Fyf=-Kf \cdot (\beta+Lhf \cdot \gamma/Vd-\delta) \qquad (6)$$

wherein, Kf represents cornering power (coefficient) determined in advance to calculate forces generated in the front wheels 19FL, 19FR in accordance with the tire sideslip angles of the front wheels 19FL, 19FR. Additionally, Lhf represents the predetermined distance in the forward-backward direction from the head portion position of the driver to the positions of the suspension devices 24FL, 24FR of the front wheels 19FL, 19FR (see FIG. 9).

Furthermore, the rear wheel lateral force Fyr representing a sum total of the lateral forces applied to the respective rear wheels 19RL, 19RR is calculated on the basis of formula (7) provided below according to the vehicle gravity center point sideslip angle β calculated in the above-described formula (5), the yaw rate γ, and the vehicle body speed Vd detected in step S310.

$$Fyr = -Kr \cdot (\beta - Lhr \cdot \gamma / Vd) \tag{7}$$

wherein, Kr represents cornering power (coefficient) determined in advance to calculate force generated in the rear wheel in accordance with the tire sideslip angle of the rear wheel. Additionally, Lhr represents the predetermined distance in the forward-backward direction from the head portion position of the driver to the positions of the suspension devices 24RL, 24RR of the rear wheels 19RL, 19RR (see FIG. 9).

The front wheel vehicle body forward-backward force Ffw is calculated on the basis of the formula (8) provided below according to the front wheel lateral force Fyf calculated in the above-described formula (6) and the steering angle δ of the front wheels 19FL, 19FR detected in step S310.

$$Ffw = Fyf \sin \delta \tag{8}$$

Furthermore, the rear wheel vehicle body forward-backward force Frw is calculated on the basis of the formula (9) provided below according to the driver request generation driving force value Fwr and the sum Tb of the brake torques applied to the two rear wheels 19RL, 19RR detected in step S310.

$$Frw = Fwr - Tb \cdot r - R \tag{9}$$

wherein, r represents the predetermined tire radius of the rear wheels 19RL, 19RR and R shows the predetermined sum of rolling resistance forces applied to the respective rear wheels 19RL, 19RR.

In step S350, vehicle state information such as the crewmember head portion displacement amount dh calculated in step S320, the vehicle body pitch angle θ calculated in step S330, and the front wheel vehicle body forward-backward force Ffw and the rear wheel vehicle body forward-backward force Frw calculated in step S340 is outputted to the vehicle movement generalizing section 103 (see FIG. 5). Thus, the processing in the vehicle state calculating section 105 is terminated.

Next, processing executed in the crewmember vibration damping control section 107 will be explained with references to FIGS. 5, 11, and 12.

Figure 11:
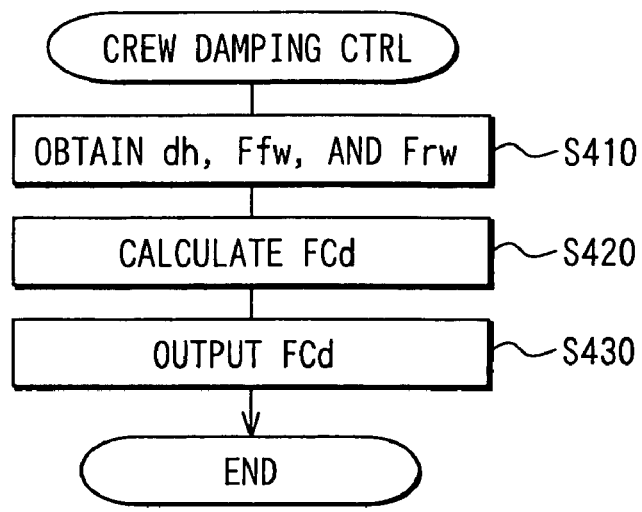
FIG. 11 is a flowchart of a process executed by a crewmember vibration damping control section of the vehicle integration control system of FIG. 1.

As shown in FIG. 11, in the crewmember vibration damping control section 107, the vehicle state information (crewmember head portion displacement amount dh, front wheel vehicle body forward-backward force Ffw and rear wheel vehicle body forward-backward force Frw) is first obtained by the vehicle movement generalizing section 103 in step S410 (see FIG. 5).

Next, in step S420, the crewmember vibration damping driving force correcting value FCd is calculated on the basis of the information obtained in step S410. Here, the crewmember vibration damping driving force correcting value FCd is a correcting value of the driver request generation driving force value Fwr set representing a value for restraining the displacement of the head portion of the driver of the vehicle generated when the driving force (in its turn, vehicle body forward-backward force applied to the front wheel and the rear wheel) outputted from the driving system is changed on the basis of the driver request generation driving force value Fwr.

This processing of step S420 will be explained with reference to the control block diagram of the crewmember vibration damping control section 107 of FIG. 12.

Figure 12:
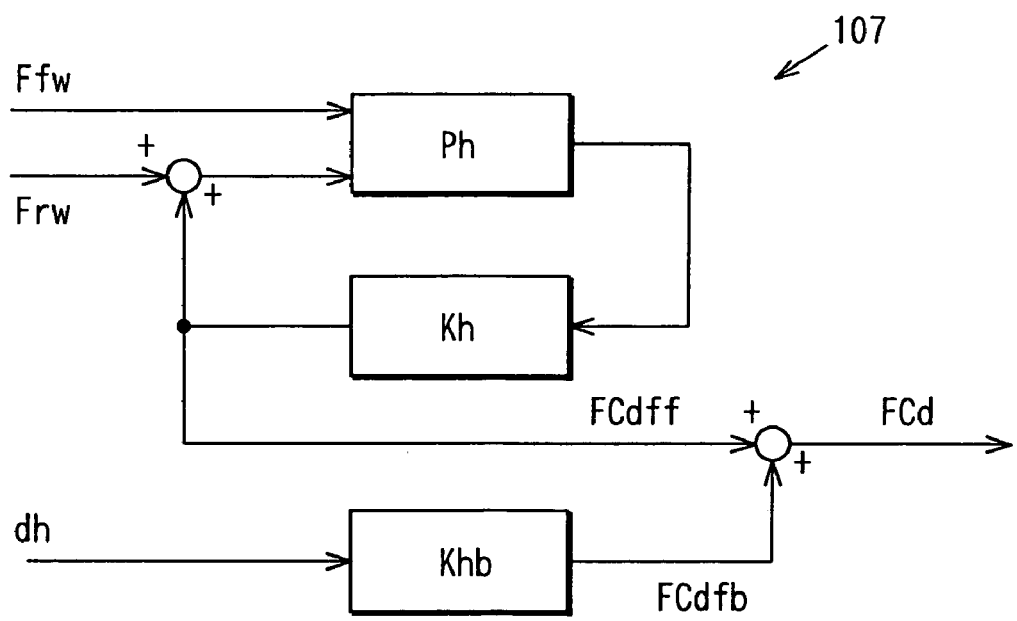
FIG. 12 is a block diagram of a constructional element of the crewmember vibration damping control section of FIG. 11.

As shown in FIG. 12, in step S420 of this embodiment, a crewmember vibration damping driving force foreknowledge correcting value FCdff representing a feed forward like correcting value of the driver request generation driving force value Fwr for restraining the displacement of the head portion of the driver of the vehicle generated when the driving force outputted from the driving system changes on the basis of the driver request generation driving force value Fwr is first calculated by control blocks Ph, Kh with the front wheel vehicle body forward-backward force Ffw and the rear wheel vehicle body forward-backward force Frw as inputs.

Here, the calculating model of the crewmember vibration damping driving force foreknowledge correcting value FCdff having the control blocks Ph, Kh within FIG. 12 includes a vibrating model according to dynamic characteristics of the suspension devices 24 and physical characteristics such as a vehicle body shape according to the individual vehicle. The control block Ph is a control block constructed according to a predetermined model in which the front wheel vehicle body forward-backward force Ffw and the rear wheel vehicle body forward-backward force Frw are set to inputs and the head portion position of the driver of the vehicle is calculated (outputted) with the displacing amount of each part of the vehicle body representing a state variable. Furthermore, the control block Kh is a constant gain with respect to the state variable of the above model. Therfore, the control block is constructed according to a constant gain predetermined in advance to convert the head portion position of the driver calculated by the control block Ph into the crewmember vibration damping driving force foreknowledge correcting value FCdff representing a correcting value of the driver request generation driving force value Fwr.

Furthermroe, in step S420, as shown in FIG. 12, a crewmember vibration damping driving force feedback correcting value FCdfb representing a feedback correcting value of the crewmember vibration damping driving force foreknowledge correcting value FCdff is calculated by a control block Khb with the crewmember head portion displacement amount dh as an input. The control block Khb within FIG. 12 is a control block constructed according to a constant gain determined in advance to convert the crewmember head portion displacement amount dh into the crewmember vibration damping driving force feedback correcting value FCdfb.

In step S420, a crewmember vibration damping driving force correcting value FCd is calculated by correcting the crewmember vibration damping driving force foreknowledge correcting value FCdff calculated as described above by the crewmember vibration damping driving force feedback correcting value FCdfb. Concretely, for example, as shown in FIG. 12, the sum of the crewmember vibration damping driving force foreknowledge correcting value FCdff and the crewmember vibration damping driving force feedback correcting value FCdfb is calculated as the crewmember vibration damping driving force correcting value FCd.

With respect to the processing of step S420, it is sufficient to calculate the crewmember vibration damping driving force correcting value FCd on the basis of the crewmember head portion displacement amount dh, the front wheel vehicle body forward-backward force Ffw and the rear wheel vehicle body forward-backward force Frw, and no processing is limited to the construction shown in FIG. 12. For example, the relation of the crewmember head portion displacement amount dh, the front wheel vehicle body forward-backward force Ffw, the rear wheel vehicle body forward-backward force Frw, and the crewmember vibration damping driving force correcting value FCd may be stored in the ROM of the VEHICLE GENERALIZING ECU 61 as a map data set in advance via feeling evaluation, etc. in the real vehicle and the crewmember vibration damping driving force correcting value FCd may be also calculated on the basis of this map data.

In step S430, the processing in the crewmember vibration damping control section 107 is once terminated by outputting the crewmember vibration damping driving force correcting value FCd calculated in step S420 to the vehicle movement generalizing section 103 (see FIG. 5).

Next, processing executed in the vehicle body vibration damping control section 109 will be explained with reference to FIGS. 5, 13, and 14.

Figure 13:
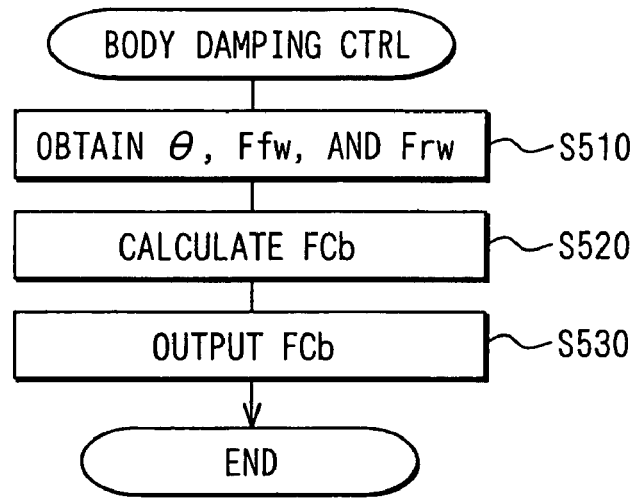
FIG. 13 is a flowchart of a process executed by a vehicle body vibration damping control section of the vehicle integration control system of FIG. 1.

As shown in FIG. 13, in the vehicle body vibration damping control section 109, vehicle state information (vehicle body pitch angle θ, front wheel vehicle body forward-backward force Ffw and rear wheel vehicle body forward-backward force Frw) is first obtained from the vehicle movement generalizing section 103 in step S510 (see FIG. 5).

Next, in step S520, the vehicle body vibration damping driving force correcting value FCb is calculated on the basis of the information obtained in step S510. Here, the vehicle body vibration damping driving force correcting value FCb is a correcting value of the driver request generation driving force value Fwr set as a value for restraining vehicle body vibration (spring upward vibration) of the vehicle generated when the driving force outputted from the driving system is changed on the basis of the driver request generation driving force value Fwr.

This processing in step S520 will be explained with reference to the control block diagram of the vehicle body vibration damping control section 109 shown in FIG. 14.

Figure 14:
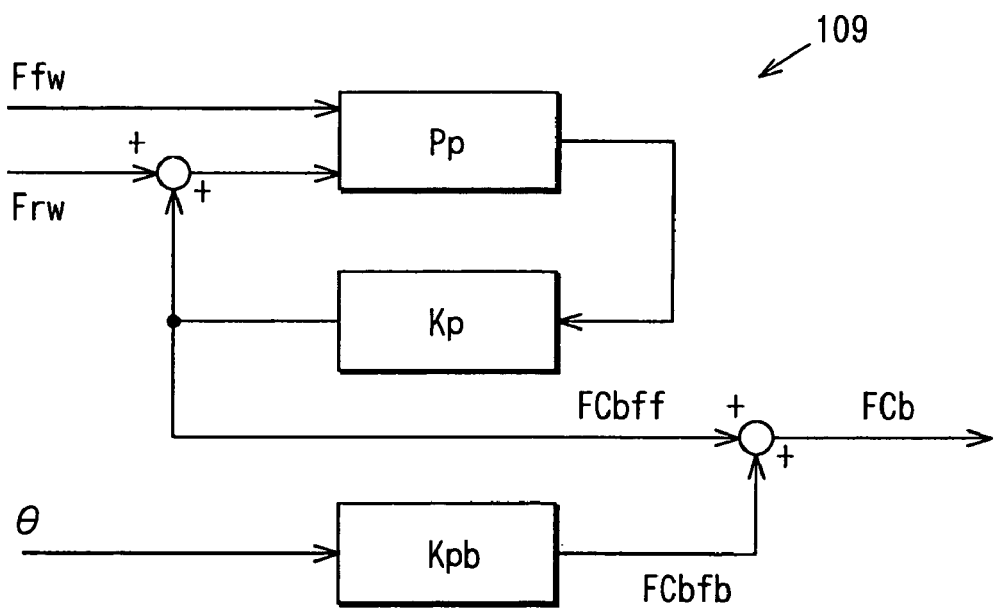
FIG. 14 is a block diagram of a constructional element of the vehicle body vibration damping control section of FIG. 13.

As shown in FIG. 14, in step S520, a vehicle body vibration damping driving force foreknowledge correcting value FCbff representing a feed forward like correcting value of the driver request generation driving force value Fwr for restraining the vehicle body vibration of the vehicle generated in the changing case of the driving force outputted from the driving system on the basis of the driver request generation driving force value Fwr is first calculated by control blocks Pp, Kp with the front wheel vehicle body forward-backward force Ffw and the rear wheel vehicle body forward-backward force Frw as inputs.

Here, a calculating model of the vehicle body vibration damping driving force foreknowledge correcting value FCbff having the control blocks Pp, Kp within FIG. 14 includes a vibrating model according to dynamic characteristics of the suspension devices 24 and physical characteristics such as a vehicle body shape according to the individual vehicle. The control block Pp is a control block constructed according to a predetermined model in which the front wheel vehicle body forward-backward force Ffw and the rear wheel vehicle body forward-backward force Frw are set to inputs and the vehicle body pitch angle of the vehicle is calculated (outputted) with the displacing amount of each part of the vehicle body as a state variable. Furthermore, the control block Kp is a constant gain with respect to the state variable of the above model, and is here a control block constructed by a constant gain predetermined in advance to convert the vehicle body pitch angle calculated by the control block Pp into the vehicle body vibration damping driving force foreknowledge correcting value FCbff as a correcting value of the driver request generation driving force value Fwr.

Furthermore, in step S520, as shown in FIG. 14, a vehicle body vibration damping driving force feedback correcting value FCbfb as a feedback correcting value of the vehicle body vibration damping driving force foreknowledge correcting value FCbff is calculated by a control block Kpb with the vehicle body pitch angle θ inputted from the vehicle movement generalizing section 103 as an input. The control block Kpb within FIG. 14 is a control block constructed by a constant gain determined in advance to convert the vehicle body pitch angle θ into the vehicle body vibration damping driving force feedback correcting value FCbfb.

In step S520, the vehicle body vibration damping driving force correcting value FCb is calculated by correcting the vehicle body vibration damping driving force foreknowledge correcting value FCbff calculated as described above by the vehicle body vibration damping driving force feedback correcting value FCbfb. Concretely, for example, as shown in FIG. 14, the sum of the vehicle body vibration damping driving force foreknowledge correcting value FCbff and the vehicle body vibration damping driving force feedback correcting value FCbfb is calculated as the vehicle body vibration damping driving force correcting value FCb.

With respect to the processing in step S520, it is sufficient to calculate the vehicle body vibration damping driving force correcting value FCb on the basis of the vehicle body pitch angle θ, the front wheel vehicle body forward-backward force Ffw, and the rear wheel vehicle body forward-backward force Frw. No processing is limited to the construction shown in FIG. 14. For example, the relationship of the vehicle body pitch angle θ, the front wheel vehicle body forward-backward force Ffw, the rear wheel vehicle body forward-backward force Frw, and the vehicle body vibration damping driving force correcting value FCb may be registered to the ROM of the VEHICLE GENERALIZING ECU 61 as map data set in advance via feeling evaluation, etc. in the real vehicle, and the vehicle body vibration damping driving force correcting value FCb may be also calculated on the basis of these map data.

In step S530, the processing in the vehicle body vibration damping control section 109 is once terminated by outputting the vehicle body vibration damping driving force correcting value FCb calculated in S520 to the vehicle movement generalizing section 103 (see FIG. 5).

Next, processing executed by the driving system generalizing section 111 will be explained with reference to FIGS. 5 and 15.

Figure 15:
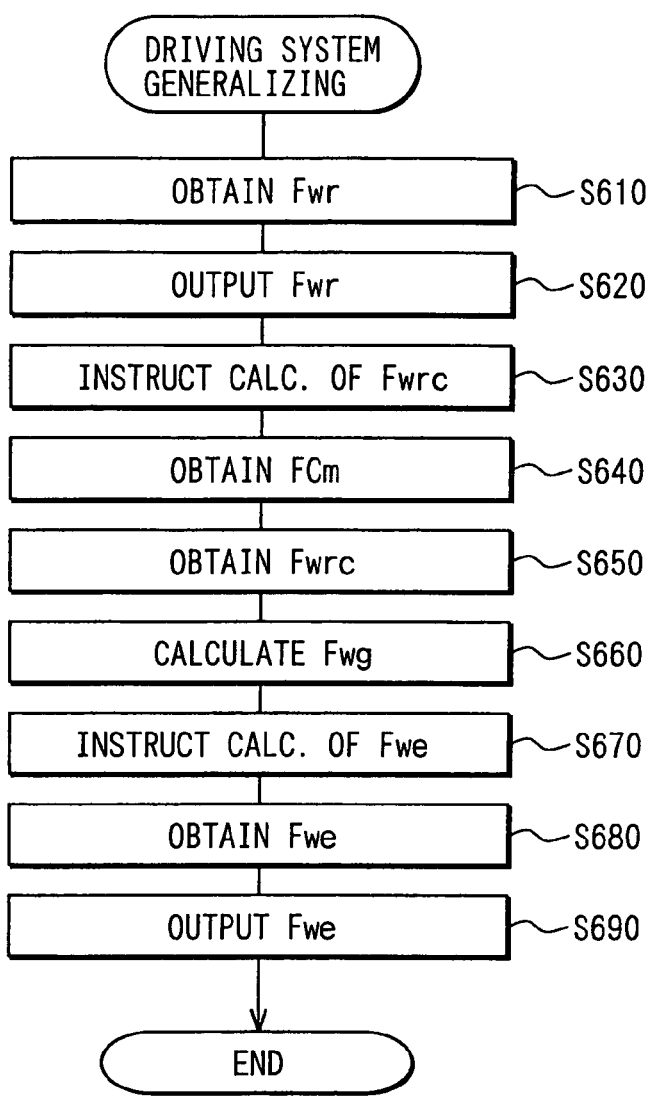
FIG. 15 is a flowchart of a process executed by a driving system generalizing section of the vehicle integration control system of FIG. 1.

As shown in FIG. 15, in the driving system generalizing section 111, the driver request generation driving force value Fwr is first obtained by the driving system operation guide generating section 117 in S610 (see FIG. 5).

Next, in step S620, the driver request generation driving force value Fwr obtained in step S610 is outputted to the vehicle control generalizing section 101 (see FIG. 5).

Next, in S step 630, instructions of the calculation of a driver request generation driving force value Fwrc after the driving system vibration damping correction (described later) are given to the driving system vibration damping control section 113. Concretely, the instructions of the calculation of the driver request generation driving force value Fwrc after the driving system vibration damping correction corresponding to the driver request generation driving force value Fwr are given by sending-out the driver request generation driving force value Fwr obtained in step S610 to the driving system vibration damping control section 113 (see FIG. 5). Here, the driver request generation driving force value Fwrc after the driving system vibration damping correction is a value after the correction of the driver request generation driving force value Fwr set as a value for restraining torsional vibration generated in the drive shaft 15 when the driving force outputted from the driving system is changed on the basis of the driver request generation driving force value Fwr. In this embodiment, the driver request generation driving force value Fwrc after the driving system vibration damping correction is calculated on the basis of the processing of step S720 described later (see FIGS. 16 and 17).

In step S640, the vehicle movement vibration damping driving force correcting value FCm is obtained from the vehicle control generalizing section 101 as instructions for performing the control of the driving system corresponding to the vehicle movement vibration damping driving force correcting value FCm from the vehicle control generalizing section 101 (see FIG. 5).

Next, in step S650, the driver request generation driving force value Fwrc after the driving system vibration damping correction is obtained from the driving system vibration damping control section 113 as a reply to the calculation instructions performed in step S630 (see FIG. 5).

In step S660, a target generation driving force guide value Fwg corresponding to the final driving force outputted to the drive shaft 15 through the AT 13 from the engine 11 is calculated by driving system driving force control processing by correcting the driver request generation driving force value Fwrc after the driving system vibration damping correction obtained in step S650 by the vehicle movement vibration damping driving force correcting value FCm obtained in step S640.

Concretely, for example, the target generation driving force guide value Fwg is calculated by adding the driver request generation driving force value Fwrc after the driving system vibration damping correction and the vehicle movement vibration damping driving force correcting value FCm as shown by the following formula (10).

$$Fwg = Fwrc + FCm \quad (10).$$

Next, in step S670, instructions of the calculation of an engine driving force command value Fwe (described later) are given to the driving source operation guide calculating section 115. Concretely, for example, the calculation of the engine driving force command value Fwe (corresponding to the driving force outputted from the engine 11) corresponding to the target generation driving force guide value Fwg (corresponding to the driving force outputted to the driving system (drive shaft 15 in this embodiment)) is instructed by transmitting the target generation driving force guide value Fwg calculated in step S660 to the driving source operation guide calculating section 115 (see FIG. 5).

Next, in step S680, the engine driving force command value Fwe is obtained from the driving source operation guide calculating section 115 as a reply to the calculation instructions performed in step S670 (see FIG. 5).

Next, in subsequent step S690, the engine driving force command value Fwe obtained in step S680 is outputted to the ENGINE ECU 51 (engine control 91a).

In this case, the driving force of the engine 11 is controlled to a value corresponding to the engine driving force command value Fwe by driving force control of the engine 11 using the ENGINE ECU 51 based on this engine driving force command value Fwe. Concretely, for example, the ENGINE ECU 51 controls the driving force of the engine 11 to the value corresponding to the engine driving force command value Fwe by changing an intake air amount, a fuel supply amount, etc. to the engine 11.

When the processing of step S690 is performed in this way, the processing in the driving system generalizing section 111 is once terminated.

Next, processing executed in the driving system vibration damping control section 113 will be explained with reference to FIGS. 5, 16, and 17.

Figure 16:
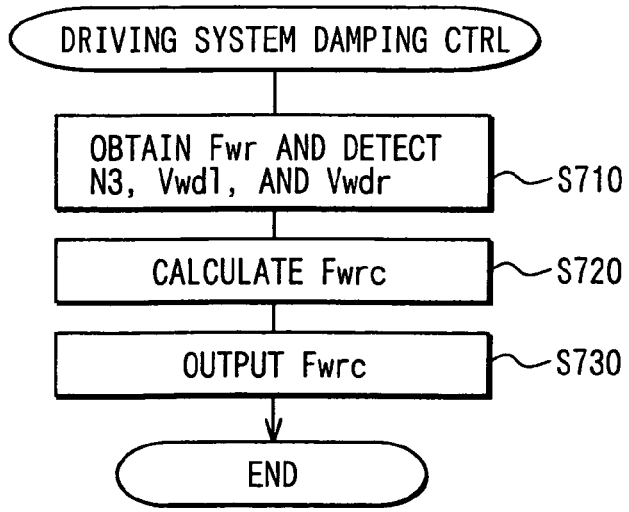
FIG. 16 is a flowchart of a process executed by a driving system vibration damping control section of the vehicle integration control system of FIG. 1.

As shown in FIG. 16, in the driving system vibration damping control section 113, the driver request generation driving force value Fwr is first obtained from the driving system generalizing section 111 in step S710 (see FIG. 5). Furthermore, in step S710, the rotating speed N3 of the drive shaft 15, the rotating speed Vwdl of the left drive wheel 19RL, and the rotating speed Vwdr of the right drive wheel 19RR are also detected. Concretely, the rotating speed N3 of the drive shaft 15 is detected by inputting this rotating speed N3 from e.g., the ATECU 53 (AT control 93a). Further yet, the rotating speed Vwdl of the left drive wheel 19RL and the rotating speed Vwdr of the right drive wheel 19RR are detected by inputting these rotating speeds Vwdl, Vwdr from the BRAKE ECU 55 (brake control 95a).

Next, in step S720, the driver request generation driving force value Fwrc after the driving system vibration damping correction is calculated on the basis of the information obtained in step S710. This calculation processing of step S720 will be explained by using the control block diagram of the driving system vibration damping control section 113 shown in FIG. 17.

In step S720 of this embodiment, a driver request generation driving force value Fwrcff after the driving system vibration damping foreknowledge correction as a value after the feed forward like correction of the driver request generation driving force value Fwr for restraining the torsional vibration generated in the drive shaft 15 in the changing case of the driving force outputted from the driving system on the basis of the driver request generation driving force value Fwr is first calculated by substituting the driver request generation driving force value Fwr into a predetermined recurrence formula.

The recurrence formula described here is a so-called pulse transmission function. For example, as shown in FIG. 17, the recurrence formula is equivalent to a transmission function calculated as the product of Pptr/Ppt and the driver request generation driving force value Fwr. In this case, Pptr/Ppt uses a predetermined model Ppt located as a model describing characteristics in transmitting the torque generated in the engine 11 until the drive wheels 19RL, 19RR, and also uses a predetermined model Pptr located as a model describing characteristics in transmitting the torque generated in the engine 11 in a desirable format until the drive wheels 19RL, 19RR.

Figure 17:
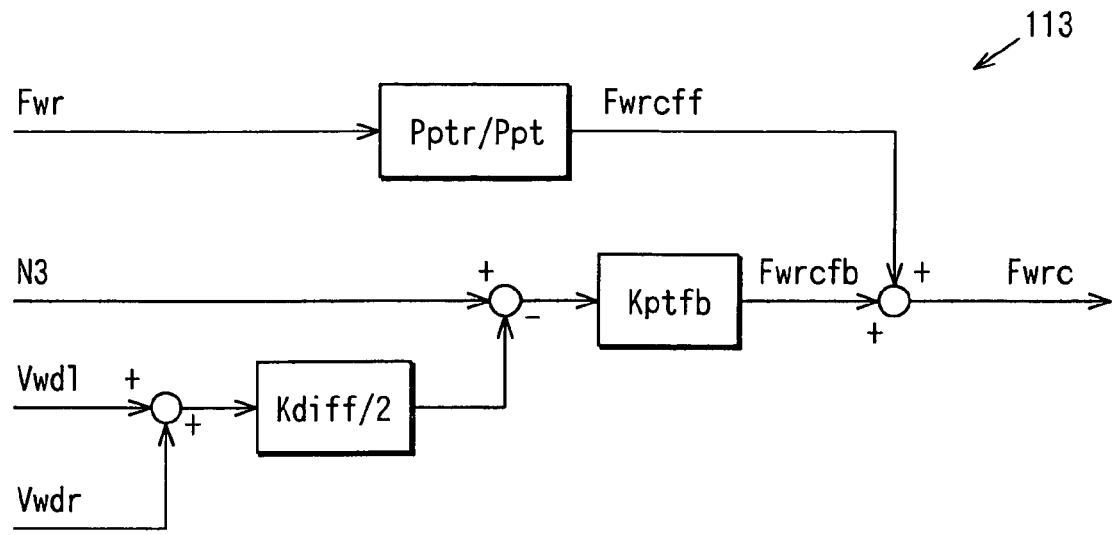
FIG. 17 is a block diagram of a constructional element of the driving system vibration damping control of FIG. 16.

Further, in step S720, as shown in FIG. 17, a driving system vibration damping driving force feedback correcting value Fwrcfb as a feedback correcting value of the driver request generation driving force value Fwrcff after the driving system vibration damping foreknowledge correction is calculated by control blocks Kdiff/2, Kptfb in which the rotating speed N3 of the drive shaft 15, the rotating speed Vwdl of the left drive wheel 19RL and the rotating speed Vwdr of the right drive wheel 19RR are set to inputs.

Here, the control block Kdiff/2 of FIG. 17 is a control block constructed as a constant gain which is the product of 1/2 and a predetermined gear ratio Kdiff of a differential gear 17. Accordingly, in this embodiment, an amount Sc (hereinafter also called a "torsional amount corresponding value Sc of the drive shaft 15") showing the degree of torsion generated in the drive shaft 15 and calculated by the following formula (11) is inputted to the control block Kpffb of FIG. 17.

$$Sc = N3 - (Kdiff/2) \cdot (Vwdl + Vwdr) \quad (11).$$

Further, the control block Kptfb within FIG. 17 is a control block constructed as a constant gain (driving system vibration damping feedback gain) determined in advance to convert the torsional amount corresponding value Sc of the drive shaft 15 calculated in the above formula (11) into the driving system vibration damping driving force feedback correcting value Fwrcfb.

Namely, in this embodiment, the driving system vibration damping driving force feedback correcting value Fwrcfb is equivalent to the value calculated by the following formula (12).

$$\begin{aligned} Fwrcfb &= Kptfb \cdot (N3 - (Kdiff/2) \cdot (Vwdl + Vwdr)) \quad (12) \\ &= Kptfb \cdot Sc. \end{aligned}$$

In step S720, the target generation driving force premise value Fwrc after the driving system vibration damping correction is calculated by correcting the driver request generation driving force value Fwrcff after the driving system vibration damping foreknowledge correction calculated as described above by the driving system vibration damping driving force feedback correcting value Fwrcfb. Concretely, for example, as shown in FIG. 17, the sum of the driver request generation driving force value Fwrcff after the driving system vibration damping foreknowledge correction and the driving system vibration damping driving force feedback correcting value Fwrcfb is calculated as the driver request generation driving force value Fwrc after the driving system vibration damping correction.

No processing of step S720 is limited to the construction shown in FIG. 17 if the driver request generation driving force value Fwrc after the driving system vibration damping correction is calculated on the basis of the driver request generation driving force value Fwr, the rotating speed N3 of the drive shaft 15, the rotating speed Vwdl of the left drive wheel 19RL and the rotating speed Vwdr of the right drive wheel 19RR. For example, the relation of the driver request generation driving force value Fwr, the rotating speed N3 of the drive shaft 15, the rotating speed Vwdl of the left drive wheel 19RL, the rotating speed Vwdr of the right drive wheel 19RR and the driver request generation driving force value Fwrc after the driving system vibration damping correction may be registered to the ROM of the VEHICLE GENERALIZING ECU 61 as map data set in advance via feeling evaluation, etc. in the real vehicle, and the driver request generation driving force value Fwrc after the driving system vibration damping correction may be also calculated on the basis of these map data.

In step S730, the processing in the driving system vibration damping control section 113 is terminated by outputting the driver request generation driving force value Fwrc after the driving system vibration damping correction calculated in step S720 to the driving system generalizing section 111 (see FIG. 5).

Next, processing executed in the driving system operation guide generating section 117 will be explained with reference to FIGS. 5, 18, 19.

Figure 18:
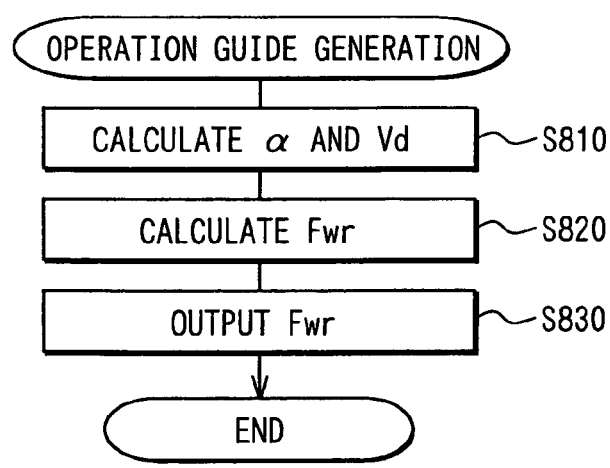
FIG. 18 is a flowchart of a process executed by a driving system operation guide generating section of the vehicle integration control system of FIG. 1.
Figure 19:
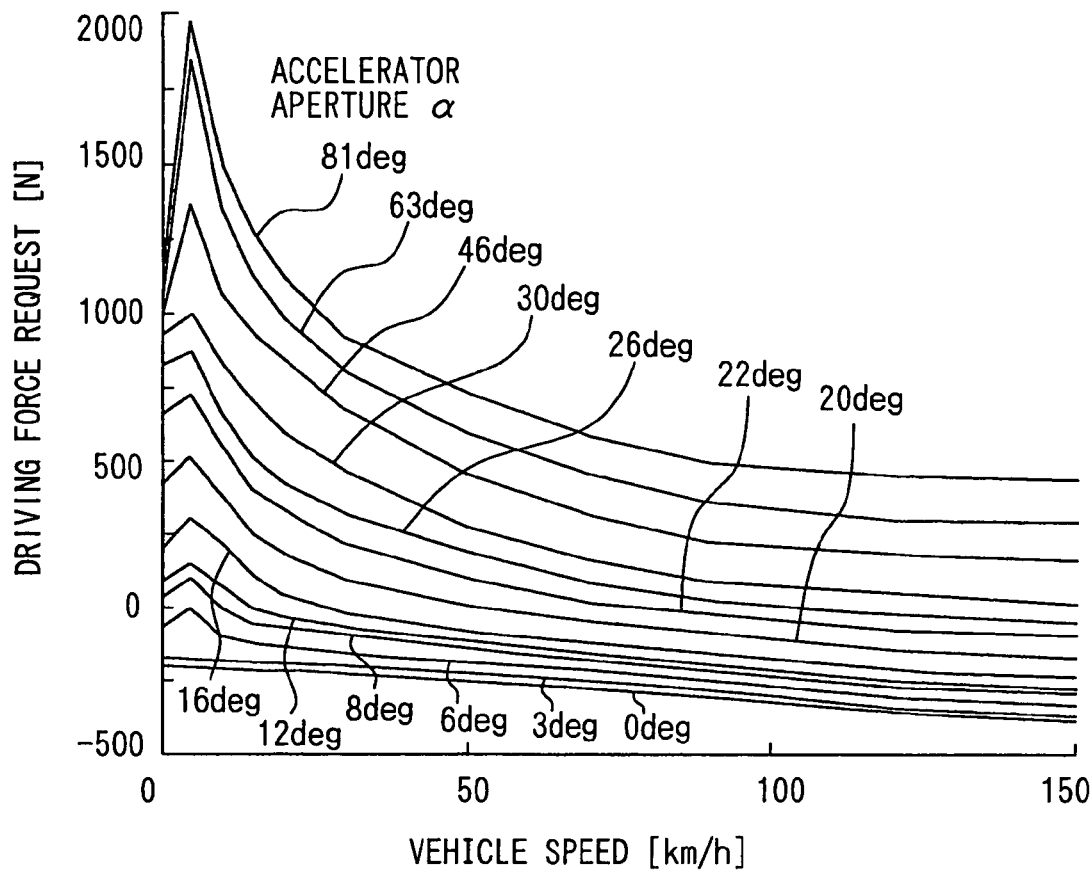
FIG. 19 is a graph illustrating a relationship between an accelerator pedal aperture, a vehicle speed, and a driver request generation driving force value in accordance with the vehicle integration control system of FIG. 1.

As shown in FIG. 18, in the driving system operation guide generating section 117, the accelerator pedal aperture a and the vehicle body speed Vd are first detected in step S810.

Concretely, the accelerator pedal aperture α is detected by inputting the accelerator pedal aperture a from the ENGINE ECU 51 (engine control 91a).

Furthermore, for example, the vehicle body speed Vd is detected by inputting the rotating speed Vwsr of the right side driven wheel 19FR and the rotating speed Vwsl of the left side driven wheel 19FL from the BRAKE ECU 55 (brake control 95a), and calculating an average value of these rotating speeds Vwsr, Vwsl as the vehicle body speed Vd.

Next, in step S820, the driver request generation driving force value Fwr corresponding to the driving force (driving force outputted from the engine 11 to the drive shaft 15 through the AT 13 in this embodiment) outputted from the driving system is calculated on the basis of the accelerator pedal aperture α and the vehicle body speed Vd detected in step S810. For example, this calculation may be also made on the basis of map data (see FIG. 19) showing the relation of the accelerator pedal aperture α, the vehicle body speed Vd and the driver request generation driving force value Fwr registered to the ROM of the VEHICLE GENERALIZING ECU 61 in advance.

In this processing, the driver request generation driving force value Fwr may be also set by using an arithmetic formula, etc. set via feeling evaluation, etc. in the real vehicle on the basis of only the accelerator pedal aperture a. However, it is preferable to set a construction for calculating the driver request generation driving force value Fwr on the basis of the accelerator pedal aperture a and the vehicle body speed Vd as described above from the viewpoint of accuracy.

In step S830, the processing in the driving system operation guide generating section 117 is terminated by outputting the driver request generation driving force value Fwr calculated in step S820 to the driving system generalizing section 111 (see FIG. 5).

Next, processing executed in the driving source operation guide calculating section 115 will be explained with reference to FIGS. 5 and 20.

Figure 20:
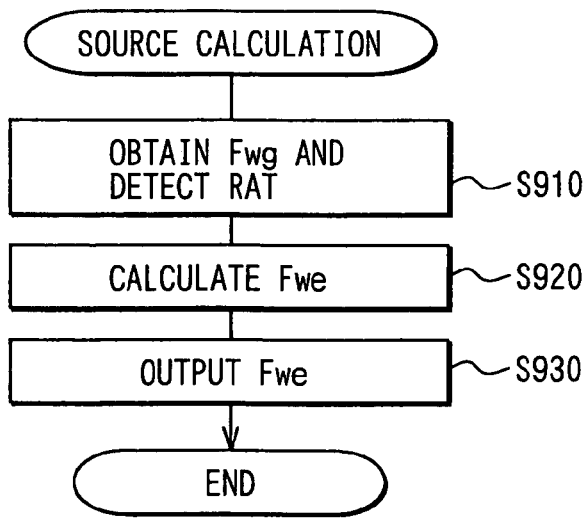
FIG. 20 is a flowchart of a process executed by a driving source operation guide calculating section of the vehicle integration control system of FIG. 1.

As shown in FIG. 20, in the driving source operation guide calculating section 115, the target generation driving force guide value Fwg is first obtained from the driving system generalizing section 111 in step S910 (see FIG. 5). Further, in step S910, the speed changing ratio RAT using the AT 13 is also detected. Concretely, for example, a torque amplifying ratio Ra using a torque converter as a constructional element of the AT 13, and a speed changing ratio Rt using a secondary speed change gear as another constructional element of the AT 13 are detected. A multiplying value of Ra and Rt may be also detected as the speed changing ratio RAT using the AT 13.

Here, the torque amplifying ratio Ra using the torque converter may be also detected by inputting the rotating speed N1 of an input shaft of the torque converter and the rotating speed N2 of an output shaft of this torque converter from e.g., the ATECU 53 (AT control 93a), and calculating the torque amplifying ratio Ra on the basis of map data registered to the ROM of the VEHICLE GENERALIZING ECU 61 in advance as data showing the relation of the rotating speeds N1, N2 and the torque amplifying ratio Ra from these rotating speeds N1, N2.

Furthermore, the speed changing ratio Rt using the secondary speed change gear may be also detected by inputting the rotating speed N2 of an input shaft of the secondary speed change gear and the rotating speed N3 of an output shaft of this secondary speed change gear from e.g., the ATECU 53 (AT control 93a), and calculating the speed changing ratio Rt as a ratio of these rotating speeds N2, N3.

The speed changing ratio RAT using the AT 13 may be also detected by inputting the speed changing ratio RAT using the AT 13 and detected by the ATECU 53 (AT control 93*a*) on the basis of a detecting signal from a shift position switch.

Next, in step S920, the engine driving force command value Fwe as a guide value of the engine driving force corresponding to the target generation driving force guide value Fwg is calculated on the basis of the information obtained in S910. Concretely, the engine driving force command value Fwe is calculated on the basis of the following formula (13).

$$Fwe=Fwg/RAT=Fwg/(Ra \cdot Rt) \qquad (13).$$

In step S930, the processing in the driving source operation guide calculating section 115 is terminated by outputting the engine driving force command value Fwe calculated in step S920 to the driving system generalizing section 111 (see FIG. 5).

As described above, in this embodiment, the driver request generation driving force value Fwr corresponding to the driving force outputted from the driving system is calculated on the basis of the accelerator pedal depression (accelerator pedal aperture α) and the vehicle speed Vd using the driver of the vehicle.

However, no engine driving force directly corresponding to this calculated driver request generation driving force value Fwr is controlled in this embodiment.

Namely, in this embodiment, this driver request generation driving force value Fwr is corrected in the viewpoint of restriction of vibration generated in the vehicle, and the driving force of the engine 11 is then controlled to correspond to the target generation driving force guide value Fwg (concretely, the engine driving force command value Fwe provided by converting the target generation driving force guide value Fwg corresponding to the output driving force in the drive shaft 15 into a value corresponding to the output driving force of the engine 11) as a value after the correction.

Accordingly, in accordance with this embodiment, the vehicle vibration is suitably restrained in comparison with a case in which the engine driving force is directly controlled on the basis of the driver request generation driving force value Fwr corresponding to the accelerator pedal depression, etc. using the driver of the vehicle.

Concretely, in this embodiment, the driver request generation driving force value Fwr is corrected to the driver request generation driving force value Fwrc after the driving system vibration damping correction to restrain the torsional vibration generated in the drive shaft 15 when the driving force outputted from the driving system is changed on the basis of the driver request generation driving force value Fwr (step S720).

Furthermore, in this embodiment, the crewmember vibration damping driving force correcting value FCd as a correcting value of the driver request generation driving force value Fwr for restraining the displacement of the head portion of the driver of the vehicle generated in the changing case of the driving force outputted from the driving system on the basis of the driver request generation driving force value Fwr is calculated (step S420).

Further yet, in this embodiment, the vehicle body vibration damping driving force correcting value FCb as a correcting value of the driver request generation driving force value Fwr for restraining the vehicle vibration (spring upward vibration) of the vehicle generated in the changing case of the driving force outputted from the driving system on the basis of the driver request generation driving force value Fwr is calculated (step S520).

Then, in this embodiment, the target generation driving force guide value Fwg is obtained by correcting the driver request generation driving force value Fwrc after the driving system vibration damping correction by the crewmember vibration damping driving force correcting value FCd and the vehicle body vibration damping driving force correcting value FCb (see formulas (1) and (10) above). Thus, the driving force of the engine 11 is controlled to correspond to the target generation driving force guide value Fwg (engine driving force command value Fwe) (step S690).

Accordingly, in accordance with this embodiment, the effect of suitably restraining all of the torsional vibration generated in the drive shaft 15, the displacement of the head portion of the driver, and the vehicle body vibration (spring upward vibration) is obtained in comparison with a case in which the engine driving force is directly controlled on the basis of the driver request generation driving force value Fwr corresponding to the accelerator pedal depression using the driver of the vehicle, etc.

Here, in this embodiment, the ENGINE ECU 51 (engine control 91*a*) corresponds to a driving system controller, and the driving system operation guide generating section 117 corresponds to a driver request value setter. The vehicle control generalizing section 101, the vehicle movement generalizing section 103, the crewmember vibration damping control section 107, the vehicle body vibration damping control section 109, the driving system generalizing section 111 and the driving system vibration damping control section 113 correspond to a driving force corrector. Further, the vehicle state calculating section 105 corresponds to a vehicle state determiner, and the crewmember vibration damping control section 107 corresponds to a crewmember vibration damping correcting value determiner. The vehicle body vibration damping control section 109 corresponds to a vehicle body vibration damping correcting value determiner, and the driving system vibration damping control section 113 corresponds to a value determiner after the driving system vibration damping correction. Further, the steering angle sensor 26 corresponds to a steering angle detector, and the speed sensors 23RL, 23RR for the drive wheels 19RL, 19RR correspond to a drive wheel rotating speed detector. The rotating speed sensor 36 for detecting the rotating speed of the drive shaft 15 corresponds to a drive shaft rotating speed detector. The processing for detecting the vehicle body speed Vd within step S810 corresponds to processing as the vehicle body speed detector. The processing for detecting the suspension stroke amount hsf of the front wheel within step S310 corresponds to processing as a front wheel suspension displacement amount detector. The processing for detecting the suspension stroke amount hsr of the rear wheel within step S310 corresponds to processing as a rear wheel suspension displacement amount detector. The processing for detecting the sum Tb of the brake torques applied to the two rear wheels 19RL, 19RR within step S310 corresponds to processing as a rear wheel brake torque detector. The processing for calculating the front wheel lateral force Fyf within step S340 corresponds to processing as a front wheel lateral force determiner. The processing for detecting the speed changing ratio RAT using the AT 13 within step S910 corresponds to processing as a speed changing ratio detector. The processing of step S920 corresponds to processing as a driving source driving force determiner. The processing for calculating the crewmember vibration damping driving force foreknowledge correcting value FCdff within step S420 corresponds to processing as a crewmember vibration damping foreknowledge correcting value determiner. The processing for calculating the crewmember vibration damping driving force feedback correcting value FCdfb within step S420 corresponds to processing as a crewmember vibration damping feedback correcting value determiner. The processing for correcting the crewmember vibration damping driving force foreknowledge correcting value FCdff by the crewmember vibration damping driving force feedback correcting value FCdfb within step S420 corresponds to processing as a crewmember vibration damping correcting value calculator. The processing for calculating the vehicle body vibration damping driving force foreknowledge correcting value FCbff within step S520 corresponds to processing as a vehicle body vibration damping foreknowledge correcting value determiner. The processing for calculating the vehicle body vibration damping driving force feedback correcting value FCbfb within step S520 corresponds to processing as a vehicle body vibration damping feedback correcting value determiner. The processing for correcting the vehicle body vibration damping driving force foreknowledge correcting value FCbff by the vehicle body vibration damping driving force feedback correcting value FCbfb within step S520 corresponds to processing as a vehicle body vibration damping correcting value calculator. The processing for calculating the driver request generation driving force value Fwrcff after the driving system vibration damping foreknowledge correction within step S720 corresponds to processing as a value determiner after the driving system vibration damping foreknowledge correction. The processing for calculating the driving system vibration damping driving force feedback correcting value Fwrcfb within step S720 corresponds to processing as a driving system vibration damping feedback correcting value determiner. The processing for correcting the driver request generation driving force value Fwrcff after the driving system vibration damping foreknowledge correction by the driving system vibration damping driving force feedback correcting value Fwrcfb within step S720 corresponds to processing as a driver request value calculator after the driving system vibration damping correction. Further, the engine driving force command value Fwe corresponds to a driving source driving force command value.

In the explanation of the above embodiment, for example, the driving force of the engine 11 is controlled to force corresponding to the engine driving force command value Fwe by changing the intake air amount, the fuel supply amount, etc. to the engine 11 by the ENGINE ECU 51 inputting the engine driving force command value Fwe thereto.

However, in the case of the vehicle having an alternator for charging the vehicle mounting battery by using one portion of the output torque of the engine 11, the driving force of the engine 11 may be also controlled to the force corresponding to the engine driving force command value Fwe by executing the control of this alternator by alternator control (the alternator control is mounted to e.g., an alternator ECU for the alternator control separately arranged, or the ENGINE ECU 51, etc.) having a function for controlling the operation of the alternator. In the case of such a construction, the alternator control corresponds to the driving system controller.

Namely, in this case, for example, an alternator component (including the alternator and the alternator control) is first arranged within a driving system domain 75 (FIG. 2). The driving source operation guide calculating section 115 may be also constructed as a section for calculating operation guides of the engine component 91 and the alternator component as components within the driving system domain 75 as a driving system component operation guide calculating section.

For example, when it is necessary to increase the driving force of the engine 11 to control the engine driving force to the force corresponding to the engine driving force command value Fwe under the condition that the vehicle mounting battery using the alternator is charged, the driving force of the engine 11 may be also controlled to the force corresponding to the engine driving force command value Fwe by outputting a control signal for setting the electric charging amount using the alternator to be smaller than the present electric charging amount to the alternator by the alternator control on the basis of the operation guides calculated by the driving source operation guide calculating section 115.

Further, when it is necessary to reduce the driving force of the engine 11 to control the engine driving force to the force corresponding to the engine driving force command value Fwe under the condition that no vehicle mounting battery using the alternator is charged or the electric charging amount of the vehicle mounting battery using the alternator is comparatively small, the driving force of the engine 11 may be also controlled to the force corresponding to the engine driving force command value Fwe by outputting a control signal for setting the electric charging amount using the alternator to be greater than the present electric charging amount to the alternator by the alternator control on the basis of the operation guides calculated by the driving source operation guide calculating section 115.

Further, in the above embodiment, the vibration generated in the vehicle is restrained by controlling the driving force of the driving system (engine 11, etc.) by the ENGINE ECU 51 such that this driving force corresponds to the target generation driving force guide value Fwg (engine driving force command value Fwe).

However, for example, differing from the case of the above embodiment, when the AT 13 is a stepless speed change gear (CVT: Continuously Variable Transmission), the driving force of the driving system (engine 11, etc.) may be also controlled to correspond to Fwg (Fwe) by controlling the speed changing ratio of the stepless speed change gear by CVT control (for example, the CVT control is mounted to an ECU, etc. for the CVT control arranged instead of the ATECU 53 of the above embodiment) having a function for controlling the operation of the stepless speed change gear receiving the input of Fwg or Fwe. In the case of such a construction, the CVT control corresponds to the driving system controller.

In this case, the driving source operation guide calculating section 115 may be also constructed as a section for calculating the operation guide of the CVT component arranged instead of the AT component 93 of the above embodiment within the driving system domain 75 (FIG. 2) in addition to the operation guide of the engine component 91 as a driving system component operation guide calculating section.

Further, the driving force of the driving system (engine 11, etc.) may be also controlled to correspond to Fwg (Fwe) by combining at least two of the control of the engine 11 using the engine control 91a receiving the input of Fwg (Fwe), the control of the alternator using the alternator control, and the speed changing ratio control of the stepless speed change gear 13 using the CVT control on the basis of a predetermined preferential order.

In this case, for example, the driving source operation guide calculating section 115 is constructed as a section for calculating the operation guides of the engine component 91, the alternator component and the stepless speed change gear component as components within the driving system domain 75 as a driving system component operation guide calculating section.

In the case of such a construction, the engine control 91a, the alternator control and the CVT control correspond to the driving system controller.

Further, in the explanation of the above embodiment, the ECU is divided into the ENGINE ECU 51, the ATECU 53, the BRAKE ECU 55, the STEERING ECU 57, and the VEHICLE GENERALIZING ECU 61 in hardware. However, another dividing mode may be also set, and all these ECUs may be also realized as one ECU in hardware.

Further, in the explanation of the above embodiment, the invention is applied to the vehicle of the FR system, but may be also applied to the vehicle of another system such as FF, RR, MR, etc. In these cases, effects similar to those of the above embodiment are obtained.

What is claimed is:

1. A vehicle integration control system comprising:
a manager controller for setting a target generation driving force guide value as a guide value for a driving force outputted from a driving system of a vehicle; and
a driving system controller for controlling the driving force outputted from said driving system on the basis of the target generation driving force guide value set by said manager controller;
wherein said manager controller includes:
a driver request value setter for setting a driver request generation driving force value corresponding to the driving force outputted from said driving system on the basis of driving force request information of said driving system inputted by a driver of said vehicle;
a driving force corrector which corrects said driver request generation driving force value on the basis of a predetermined program to restrain vibration generated in said vehicle when the driving force outputted from said driving system changes on the basis of the driver request generation driving force value set by said driver request value setter and sets the value obtained by this correction as said target generation driving force guide value;
a vehicle state determiner to determine a determined value of a front wheel vehicle body forward-backward force representing a sum total of reaction force of the vehicle body forward-backward direction applied to a tire grounding face of a front wheel of said vehicle, a determined value of a rear wheel vehicle body forward-backward force representing a sum total of reaction force of the vehicle body forward-backward direction applied to a tire grounding face of a rear wheel of said vehicle, at least one of a determined value of a crewmember head portion displacement amount representing a vertical direction movement amount of a head portion position of the crewmember of said vehicle, and a determined value of a vehicle body pitch angle of said vehicle; and
said driving force corrector corrects said driver request generation driving force value on the basis of the determined values obtained by said vehicle state determiner and sets the value obtained by this correction as said target generation driving force guide value.

2. The vehicle integration control system according to claim 1, wherein the vehicle integration control system further comprises a vehicle speed detector for detecting the vehicle body speed of the vehicle, and
said driver request value setter sets the driver request generation driving force value corresponding to the driving force outputted from said driving system on the basis of the vehicle body speed detected by said vehicle speed detector in addition to said driving force request information.

3. The vehicle integration control system according to claim 1, wherein
said target generation driving force guide value is a value corresponding to the driving force outputted to a drive shaft through a transmission from a driving source for generating the driving force of said vehicle,
speed changing ratio detector for detecting the speed changing ratio of said transmission is arranged,
said manager controller having a driving source driving force determiner for determining a driving source driving force command value corresponding to the driving force outputted by said driving source on the basis of said target generation driving force guide value and the speed changing ratio detected by said speed changing ratio detector, and
said driving system controller controls the driving force outputted by said driving source on the basis of the driving source driving force command value determined by said driving source driving force determiner.

4. The vehicle integration control system according to claim 1, further comprising:
a front wheel lateral force determiner for determining a front wheel lateral force representing a sum total of lateral forces applied to the respective front wheels of said vehicle; and
a steering angle detector for detecting a steering angle of the front wheel of said vehicle; and
said vehicle state determiner determining the determined value of said front wheel vehicle body forward-backward force on the basis of the following arithmetic formula:

$$Ffw = Fyf \sin \delta,$$

wherein Ffw is the front wheel vehicle body forward-backward force, Fyf is the front wheel lateral force determined by said front wheel lateral force determiner, and δ is the steering angle detected by said steering angle detector.

5. The vehicle integration control system according to claim 1, further comprising:
a rear wheel brake torque detector for detecting a sum of brake torques applied to the respective rear wheels of said vehicle; and
said vehicle state determiner determines the determined value of said rear wheel vehicle body forward-backward force on the basis of the following arithmetic formula:

$$Frw = Fwr - Tb \cdot r - R$$

wherein Frw is the rear wheel vehicle body forward-backward force, Fwr is the driver request generation driving force value set by said driver request value setter, Tb is the sum of the brake torques applied to the respective rear wheels of said vehicle detected by said rear wheel brake torque detector, r is a predetermined tire radius of each rear wheel, and R is a predetermined sum of rolling resistance forces applied to the respective rear wheels.

6. The vehicle integration control system according to claim 1, further comprising:
a front wheel suspension displacement amount detector for detecting the amount of displacement of a suspension device arranged in the front wheel of said vehicle; and
a rear wheel suspension displacement amount detector for detecting the amount of displacement of a suspension device arranged in the rear wheel of said vehicle; and
said vehicle state determiner determines the determined value of said crewmember head portion displacement amount on the basis of the following arithmetic formula:

$$dh = (hsf \cdot Lhr + hsr \cdot Lhf)/(Lhf + Lhr)$$

wherein dh is the crewmember head portion displacement amount and hsf is the suspension displacement amount of the suspension device arranged in the front wheel of said vehicle detected by said front wheel suspension displacement amount detector, hsr is the suspension displacement amount of the suspension device arranged in the rear wheel of said vehicle detected by said rear wheel suspension displacement amount detector, Lhf is the predetermined forward-backward direction distance from the head portion position of the crewmember of said vehicle to the position of the suspension device of the front wheel of said vehicle, and Lhr is the predetermined forward-backward direction distance from the head portion position of the crewmember of said vehicle to the position of the suspension device of the rear wheel of said vehicle, and wherein said vehicle state determiner determines at least the determined value of said front wheel vehicle body forward-backward force, the determined value of said rear wheel vehicle body forward-backward force, and the determined value of said crewmember head portion displacing amount.

7. The vehicle integration control system according to claim 1, further comprising:

a front wheel suspension displacement amount detector for detecting the suspension displacement amount of a suspension device arranged in the front wheel of said vehicle; and a rear wheel suspension displacement amount detector for detecting the suspension displacement amount of a suspension device arranged in the rear wheel of said vehicle; and said vehicle state determiner determines the determined value of said vehicle body pitch angle on the basis of the following arithmetic formula:

$$\theta=(hsf-hsr)/L,$$

wherein θ is the vehicle body pitch angle, hsf is the suspension displacement amount of the suspension device arranged in the front wheel of said vehicle detected by said front wheel suspension displacement amount detector, hsr is the suspension displacement amount of the suspension device arranged in the rear wheel of said vehicle detected by said rear wheel suspension displacement amount detector, L is the predetermined length between the position of the suspension device arranged in the front wheel of said vehicle and the position of the suspension device arranged in the rear wheel of said vehicle, and wherein said vehicle state determiner determines at least the determined value of said front wheel vehicle body forward-backward force, the determined value of said rear wheel vehicle body forward-backward force, and the determined value of said vehicle body pitch angle.

8. The vehicle integration control system according to claim 1, wherein said driving force corrector determines a value after the correction of said driver request generation driving force value for restraining the displacement of the head portion of the crewmember of said vehicle generated when the driving force outputted from said driving system changes on the basis of the driver request generation driving force value set by said driver request value setter and sets said target generation driving force guide value on the basis of the value after the correction.

9. The vehicle integration control system according to claim 8, wherein said driving force corrector includes a crewmember vibration damping correcting value determiner for determining a crewmember vibration damping driving force correcting value representing a correcting value of said driver request generation driving force value for restraining the displacement of the head portion of the crewmember of said vehicle generated when the driving force outputted from said driving system changes on the basis of the driver request generation driving force value set by said driver request value setter, and said driving force corrector corrects said driver request generation driving force value on the basis of the crewmember vibration damping driving force correcting value determined by said crewmember vibration damping correcting value determiner.

10. The vehicle integration control system according to claim 1, wherein said vehicle state determiner determines at least the determined value of said front wheel vehicle body forward-backward force, the determined value of said rear wheel vehicle body forward-backward force, and the determined value of said crewmember head portion displacing amount, and said driving force corrector includes a crewmember vibration damping correcting value determiner for determining the crewmember vibration damping driving force correcting value representing a correcting value of said driver request generation driving force value for restraining the displacement of the head portion of the crewmember of said vehicle generated when the driving force outputted from said driving system changes on the basis of the driver request generation driving force value set by said driver request value setter by using the determined value of said front wheel vehicle body forward-backward force, the determined value of said rear wheel vehicle body forward-backward force, and the determined value of said crewmember head portion displacement amount obtained by said vehicle state determiner, and said driving force corrector corrects said driver request generation driving force value on the basis of the crewmember vibration damping driving force correcting value determined by said crewmember vibration damping correcting value determiner.

11. The vehicle integration control system according to claim 10, wherein said crewmember vibration damping correcting value determiner includes:

a crewmember vibration damping foreknowledge correcting value determiner for determining a crewmember vibration damping driving force foreknowledge correcting value as a correcting value of said driver request generation driving force value for restraining the displacement of the head portion of the crewmember of said vehicle generated when the driving force outputted from said driving system changes on the basis of the driver request generation driving force value set by said driver request value setter by using the determined value of said front wheel vehicle body forward-backward force and the determined value of said rear wheel vehicle body forward-backward force obtained by said vehicle state determiner, a crewmember vibration damping feedback correcting value determiner for determining a crewmember vibration damping driving force feedback correcting value as a feedback correcting value of said crewmember vibration damping driving force foreknowledge correcting value determined by said crewmember vibration damping foreknowledge correcting value determiner by using the determined value of said crewmember head portion displacement amount obtained by said vehicle state determiner, and a crewmember vibration damping correcting value calculator for determining said crewmember vibration damping driving force correcting value by correcting said crewmember vibration damping driving force foreknowledge correcting value determined by said crewmember vibration damping foreknowledge correcting value determiner by said crewmember vibration damping driving force feedback correcting value determined by said crewmember vibration damping feedback correcting value determiner.

12. The vehicle integration control system according to claim 1, wherein said driving force corrector determines a value after the correction of said driver request generation driving force value for restraining the vehicle body vibration of said vehicle generated when the driving force outputted from said driving system changes on the basis of the driver request generation driving force value set by said driver request value setter and sets said target generation driving force guide value on the basis of the value after the correction.

13. The vehicle integration control system according to claim 12, wherein said driving force corrector has vehicle body vibration damping correcting value determiner for determining a vehicle body vibration damping driving force correcting value as a correcting value of said driver request generation driving force value for restraining the vehicle body vibration of said vehicle generated in the changing case of the driving force outputted from said driving system on the basis of the driver request generation driving force value set by said driver request value setter, and said driving force corrector corrects said driver request generation driving force value on the basis of the vehicle body vibration damping driving force correcting value determined by said vehicle body vibration damping correcting value determiner.

14. The vehicle integration control system according to claim 1, wherein said vehicle state determiner determines at least the determined value of said front wheel vehicle body forward-backward force, the determined value of said rear wheel vehicle body forward-backward force, and the determined value of said vehicle body pitch angle, and said driving force corrector has vehicle body vibration damping correcting value determiner for determining the vehicle body vibration damping driving force correcting value as a correcting value of said driver request generation driving force value for restraining the vehicle body vibration of said vehicle generated when the driving force outputted from said driving system changes on the basis of the driver request generation driving force value set by said driver request value setter by using the determined value of said front wheel vehicle body forward-backward force, the determined value of said rear wheel vehicle body forward-backward force, and the determined value of said vehicle body pitch angle obtained by said vehicle state determiner, and said driving force corrector corrects said driver request generation driving force value on the basis of the vehicle body vibration damping driving force correcting value determined by said vehicle body vibration damping correcting value determiner.

15. The vehicle integration control system according to claim 14, wherein said vehicle body vibration damping correcting value determiner includes:

a vehicle body vibration damping foreknowledge correcting value determiner for determining the vehicle body vibration damping driving force foreknowledge correcting value as a correcting value of said driver request generation driving force value for restraining the vehicle body vibration of said vehicle generated in the changing case of the driving force outputted from said driving system on the basis of the driver request generation driving force value set by said driver request value setter by using the determined value of said front wheel vehicle body forward-backward force and the determined value of said rear wheel vehicle body forward-backward force obtained by said vehicle state determiner;

a vehicle body vibration damping feedback correcting value determiner for determining the vehicle body vibration damping driving force feedback correcting value as a feedback correcting value of said vehicle body vibration damping driving force foreknowledge correcting value determined by said vehicle body vibration damping foreknowledge correcting value determiner by using the determined value of said vehicle body pitch angle obtained by said vehicle state determiner; and a vehicle body vibration damping correcting value calculator for determining said vehicle body vibration damping driving force correcting value by correcting said vehicle body vibration damping driving force foreknowledge correcting value determined by said vehicle body vibration damping foreknowledge correcting value determiner by said vehicle body vibration damping driving force feedback correcting value determined by said vehicle body vibration damping feedback correcting value determiner.

16. The vehicle integration control system according to claim 1, wherein said driving force corrector determines a value after the correction of said driver request generation driving force value for restraining torsional vibration generated in a drive shaft for transmitting the driving force of a driving source for generating the driving force of said vehicle to a drive wheel of said vehicle when the driving force outputted from said driving system changes on the basis of the driver request generation driving force value set by said driver request value setter and sets said target generation driving force guide value on the basis of the value after the correction.

17. The vehicle integration control system according to claim 16, further comprising:

a drive wheel rotating speed detector for detecting the rotating speed of each drive wheel of said vehicle; and a drive shaft rotating speed detector for detecting the rotating speed of the drive shaft for transmitting the driving force of said driving source to the drive wheel of said vehicle; and said driving force corrector including a value determiner after the driving system vibration damping correction for determining a driver request generation driving force value after the driving system vibration damping correction as a value after the correction of said driver request generation driving force value for restraining the torsional vibration generated in the drive shaft for transmitting the driving force of said driving source to the drive wheel of said vehicle when the driving force outputted from said driving system changes on the basis of the driver request generation driving force value set by said driver request value setter by using the driver request generation driving force value set by said driver request value setter, the rotating speed of each drive wheel detected by said drive wheel rotating speed detector, and the rotating speed of the drive shaft detected by said drive shaft rotating speed detector; and said driving force corrector sets said target generation driving force guide value on the basis of the driver request generation driving force value after the driving system vibration damping correction determined by said value determiner.

18. The vehicle integration control system according to claim 17, wherein said value determiner after the driving system vibration damping correction includes:

a value determiner after the driving system vibration damping foreknowledge correction for determining a driver request generation driving force value after the driving system vibration damping foreknowledge correction as a value after the correction of said driver request generation driving force value for restraining the torsional vibration generated in the drive shaft for transmitting the driving force of said driving source to the drive wheel of said vehicle when the driving force outputted from said driving system changes on the basis of the driver request generation driving force value by using the driver request generation driving force value set by said driver request value setter;

a driving system vibration damping feedback correcting value determiner for determining the driving system vibration damping driving force feedback correcting value as a feedback correcting value of said driver request generation driving force value after the driving system vibration damping foreknowledge correction determined by said value determiner after the driving system vibration damping foreknowledge correction by using the rotating speed of said each drive wheel detected by said drive wheel rotating speed detector and the rotating speed of said drive shaft detected by said drive shaft rotating speed detector; and a driver request value calculator after the driving system vibration damping correction for determining said driver request generation driving force value after the driving system vibration damping correction by correcting the driver request generation driving force value after the driving system vibration damping foreknowledge correction determined by said value determiner after the driving system vibration damping foreknowledge correction by said driving system vibration damping driving force feedback correcting value determined by said driving system vibration damping feedback correcting value determiner.

19. The vehicle integration control system according to claim 18, wherein said driving system vibration damping feedback correcting value determiner calculates a torsional amount corresponding value of said drive shaft showing the degree of torsion generated in said drive shaft on the basis of the following arithmetic formula:

$$Sc = N3 - (Kdiff/2) \cdot (Vwdl + Vwdr),$$

wherein Sc is the torsional amount corresponding value of said drive shaft showing the degree of torsion generated in said drive shaft, N3 is the rotating, speed of said drive shaft detected by said drive shaft rotating speed detector, Vwdl is the rotating speed of a left drive wheel of said vehicle detected by said drive wheel rotating speed detector, Vwdr is the rotating speed of a right drive wheel of said vehicle detected by said drive wheel rotating speed detector, and Kdiff is a predetermined gear ratio of a differential gear of said vehicle and determines said driving system vibration damping driving force feedback correcting value by using this torsional amount corresponding value.

* * * * *